United States Patent
Shukla et al.

(10) Patent No.: US 12,523,516 B2
(45) Date of Patent: Jan. 13, 2026

(54) FLOW METER CALIBRATION

(71) Applicant: Schlumberger Technology Corporation, Sugar Land, TX (US)

(72) Inventors: Sourabh Shukla, Algiers (DZ); Garud Sridhar, London (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 241 days.

(21) Appl. No.: 18/365,383

(22) Filed: Aug. 4, 2023

(65) Prior Publication Data

US 2024/0044691 A1 Feb. 8, 2024

Related U.S. Application Data

(60) Provisional application No. 63/395,636, filed on Aug. 5, 2022.

(51) Int. Cl.
*G01F 25/10* (2022.01)
*E21B 47/10* (2012.01)

(52) U.S. Cl.
CPC .............. *G01F 25/10* (2022.01); *E21B 47/10* (2013.01)

(58) Field of Classification Search
CPC ........ G01F 25/10; G01F 25/13; G01F 15/024; G01F 1/8436; G01F 1/74; G01F 1/84; G01F 25/00; G01F 1/34; G01F 25/15; G01F 1/662; G01F 1/8477; G01F 1/76; G01F 1/86; G05B 23/0272; G06F 17/16; G06F 2111/10; G06F 30/20; E21B 47/10; E21B 2200/22; E21B 2200/20; E21B 43/00

See application file for complete search history.

(56) References Cited

U.S. PATENT DOCUMENTS

| | | | |
|---|---|---|---|
| 7,523,639 B2 | 4/2009 | Hays | |
| 9,658,097 B2* | 5/2017 | Berndt | G01F 25/10 |
| 11,697,991 B2* | 7/2023 | Machocki | E21B 47/13 |
| | | | 73/1.01 |
| 11,965,769 B2* | 4/2024 | Collver | G01F 25/10 |
| 2008/0295568 A1* | 12/2008 | Nanaji | B67D 7/085 |
| | | | 73/1.34 |
| 2010/0229965 A1* | 9/2010 | Kashima | G01F 1/6847 |
| | | | 73/861.351 |

(Continued)

FOREIGN PATENT DOCUMENTS

| | | |
|---|---|---|
| JP | 2021085723 A | 6/2021 |
| KR | 10-0971785 B1 | 7/2010 |

(Continued)

OTHER PUBLICATIONS

Kargarpour et al., "Oil and gas well rate estimation by choke formula: semi-analytical approach", Journal of Petroleum Exploration and Production Technology, vol. 9, 2019, pp. 2375-2386.

(Continued)

*Primary Examiner* — Lisa M Caputo
*Assistant Examiner* — Eric Sebastian Von Wald
(74) *Attorney, Agent, or Firm* — Jeffrey D. Frantz

(57) ABSTRACT

A method can include receiving flow rate estimates from a computational, virtual flow meter at a wellsite; receiving flow rate measurements from a physical flow meter at the wellsite; and calling for calibration of the physical flow meter based on the flow rate estimates and the flow rate measurements.

16 Claims, 15 Drawing Sheets

(56) References Cited

U.S. PATENT DOCUMENTS

| | | | | |
|---|---|---|---|---|
| 2012/0095733 | A1* | 4/2012 | Rossi | E21B 43/00 703/2 |
| 2013/0340498 | A1* | 12/2013 | Tanabe | G01F 25/10 73/1.16 |
| 2014/0379134 | A1* | 12/2014 | Tsuchiya | G06F 9/45558 700/275 |
| 2015/0276449 | A1* | 10/2015 | Ito | G01F 1/698 73/861.351 |
| 2016/0356125 | A1* | 12/2016 | Bello | G06Q 10/04 |
| 2017/0160727 | A1* | 6/2017 | Ishikawa | G05B 23/0267 |
| 2018/0073902 | A1* | 3/2018 | Gonzaga | E21B 47/12 |
| 2018/0073904 | A1 | 3/2018 | Parolini et al. | |
| 2021/0355814 | A1* | 11/2021 | Shetty | E21B 47/06 |
| 2022/0057244 | A1* | 2/2022 | Gonzaga | G01F 1/84 |
| 2024/0003242 | A1 | 1/2024 | Ambade et al. | |

FOREIGN PATENT DOCUMENTS

| | | | | |
|---|---|---|---|---|
| KR | 102162312 | B1 | 10/2020 | |
| KR | 20210075361 | A | 6/2021 | |
| WO | WO-2018195368 | A1 * | 10/2018 | ......... G05B 23/0254 |
| WO | 2023091386 | A1 | 5/2023 | |

OTHER PUBLICATIONS

Search Report and Written Opinion of International Patent Application No. PCT/US2023/071644 dated Nov. 7, 2023, 12 pages.

Ishak, M. A. B. et al., "Data Driven Versus Transient Multiphase Flow Simulator for Virtual Flow Meter Application", 2020 8th International Conference on Intelligent and Advanced Systems (ICIAS), IEEE, 2021, pp. 1-4.

Mercante, R. et al., "Virtual flow predictor using deep neural networks", Journal of Petroleum Science and Engineering, 2022, 213, 11 pages.

* cited by examiner

FLOW METER CALIBRATION

RELATED APPLICATION

This application claims priority to and the benefit of a U.S. Provisional Application having Ser. No. 63/395,636, filed 5 Aug. 2022, which is incorporated by reference herein in its entirety.

BACKGROUND

Various types of flow meters can be used at field sites to measure flow rates. For example, consider a multiphase flow meter that can measure flow rates of multiphase flow at a wellsite. In such an example, the multiphase flow meter can be a sophisticated measurement instrument that is calibrated to provide reliable and accurate flow rate measurements. Over time, responsive to various changes, a flow rate measurements from a flow meter can drift, which may be due to the flow meter losing its ability to provide reliable and accurate techniques, which may be deemed a calibration loss or a calibration failure. When a flow meter is in need of calibration (e.g., re-calibration), a crew may be called to a site to perform various tasks to calibrate the flow meter.

SUMMARY

A method can include receiving flow rate estimates from a computational, virtual flow meter at a wellsite; receiving flow rate measurements from a physical flow meter at the wellsite; and calling for calibration of the physical flow meter based on the flow rate estimates and the flow rate measurements. A system can include one or more processors; memory accessible to at least one of the one or more processors; processor-executable instructions stored in the memory and executable to instruct the system to: receive flow rate estimates from a computational, virtual flow meter at a wellsite; receive flow rate measurements from a physical flow meter at the wellsite; and call for calibration of the physical flow meter based on the flow rate estimates and the flow rate measurements. One or more computer-readable storage media can include processor-executable instructions to instruct a computing system to: receive flow rate estimates from a computational, virtual flow meter at a wellsite; receive flow rate measurements from a physical flow meter at the wellsite; and call for calibration of the physical flow meter based on the flow rate estimates and the flow rate measurements. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
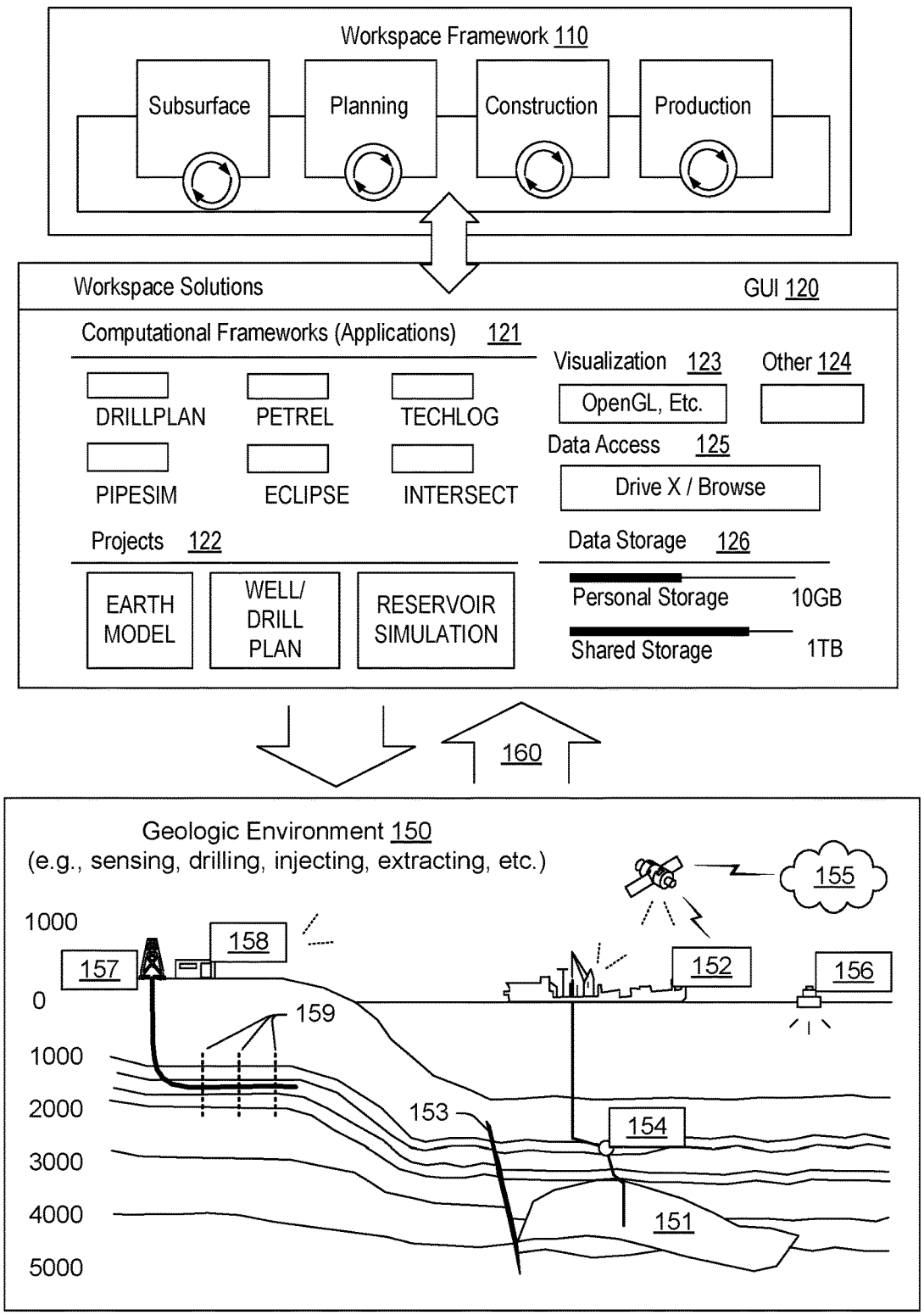
FIG. 1 illustrates an example of a system.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, predictors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, predicting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (SLB, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (SLB, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). As an example, such an environment can provide for operations that involve one or more frameworks. The DELFI environment may be referred to as the DELFI framework, which may be a framework of frameworks. As an example, the DELFI environment can include various other frameworks, which can include, for example, one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. In such an approach, one or more features of a framework that may be available in one language may be accessed via a converter. For example, consider the APACHE SPARK framework that can include features available in a particular language where a converter may convert code in another language to that particular language such that one or more of the features can be utilized. As an example, a production field may include various types of equipment, be operable with various frameworks, etc., where one or more languages may be utilized. In such an example, a converter may provide for feature flexibility and/or compatibility.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

While several simulators are illustrated in the example of FIG. 1, one or more other simulators may be utilized, additionally or alternatively. For example, consider the VISAGE geomechanics simulator (SLB, Houston Texas) or the PETROMOD simulator (SLB, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions. The MANGROVE simulator (SLB, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

Figure 2:
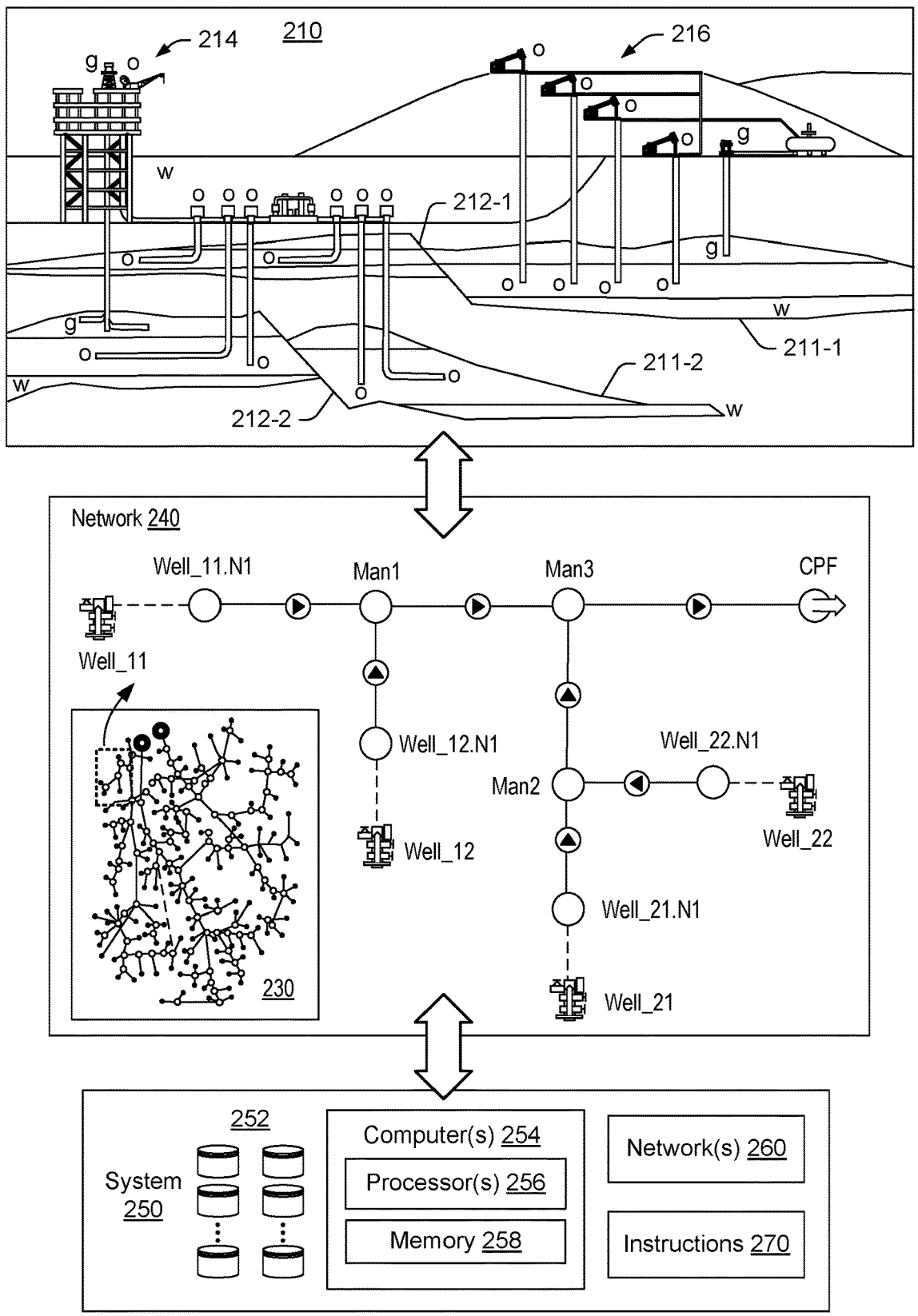
FIG. 2 illustrates examples of systems.

FIG. 2 shows an example of a geologic environment 210 that includes reservoirs 211-1 and 211-2, which may be faulted by faults 212-1 and 212-2, an example of a network of equipment 230, an enlarged view of a portion of the network of equipment 230, referred to as network 240, and an example of a system 250. FIG. 2 shows some examples of offshore equipment 214 for oil and gas operations related to the reservoir 211-2 and onshore equipment 216 for oil and gas operations related to the reservoir 211-1. In the example of FIG. 2, the geologic environment 210 can include fluids such as oil (o), water (w) and gas (g), which may be stratified in the reservoirs 211-1 and 211-2.

In the example of FIG. 2, the equipment 214 and 216 can include one or more of drilling equipment, wireline equipment, production equipment, etc. For example, consider the equipment 214 as including a drilling rig that can drill into a formation to reach a reservoir target where a well can be completed for production of hydrocarbons. As an example, the equipment 216 can include production equipment such as wellheads, valves, pump equipment, gas handling equipment, flow meters, etc. As an example, one or more features of the system 100 of FIG. 1 may be utilized for operations in the geologic environment 210. For example, consider utilizing a drilling or well plan framework, a drilling execution framework, a production framework, etc., to plan, execute, etc., one or more drilling operations, production operations, etc.

In FIG. 2, the network 240 can be an example of a relatively small production system network. As shown, the network 240 forms somewhat of a tree like structure where flowlines represent branches (e.g., segments) and junctions represent nodes. As shown in FIG. 2, the network 240 provides for transportation of fluid (e.g., oil, water and/or gas) from well locations along flowlines interconnected at junctions with final delivery at a central processing facility (CPF). Where fluid includes solids (e.g., sand, etc.), one or more pieces of equipment may provide for solids removal, collection, etc.

In the example of FIG. 2, various portions of the network 240 may include conduit. For example, consider a perspective view of a geologic environment that includes two conduits which may be a conduit to Man1 and a conduit to Man3 in the network 240, where Man1, Man2 and Man3 are manifolds.

As shown in FIG. 2, the example system 250 includes one or more information storage devices 252, one or more computers 254, one or more networks 260 and instructions 270 (e.g., organized as one or more sets of instructions). As to the one or more computers 254, each computer may include one or more processors (e.g., or processing cores) 256 and memory 258 for storing the instructions 270 (e.g., one or more sets of instructions), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, information that may be stored in one or more of the storage devices 252 may include information about equipment, location of equipment, orientation of equipment, fluid characteristics, etc.

As an example, the instructions 270 can include instructions (e.g., stored in the memory 258) executable by at least one of the one or more processors 256 to instruct the system 250 to perform various actions. As an example, the system 250 may be configured such that the instructions 270 provide for establishing a framework, for example, that can perform network modeling (see, e.g., the PIPESIM framework of the example of FIG. 1, etc.) and/or other modeling. As an example, one or more methods, techniques, etc. may be performed using one or more sets of instructions, which may be, for example, the instructions 270 of FIG. 2.

As an example, various graphics in FIG. 2 may be part of a graphical user interface (GUI) that can be generated using executable instructions that may be executable locally and/or remotely using local and/or remote display devices (e.g., a mobile device, a workstation, etc.).

Figure 3:
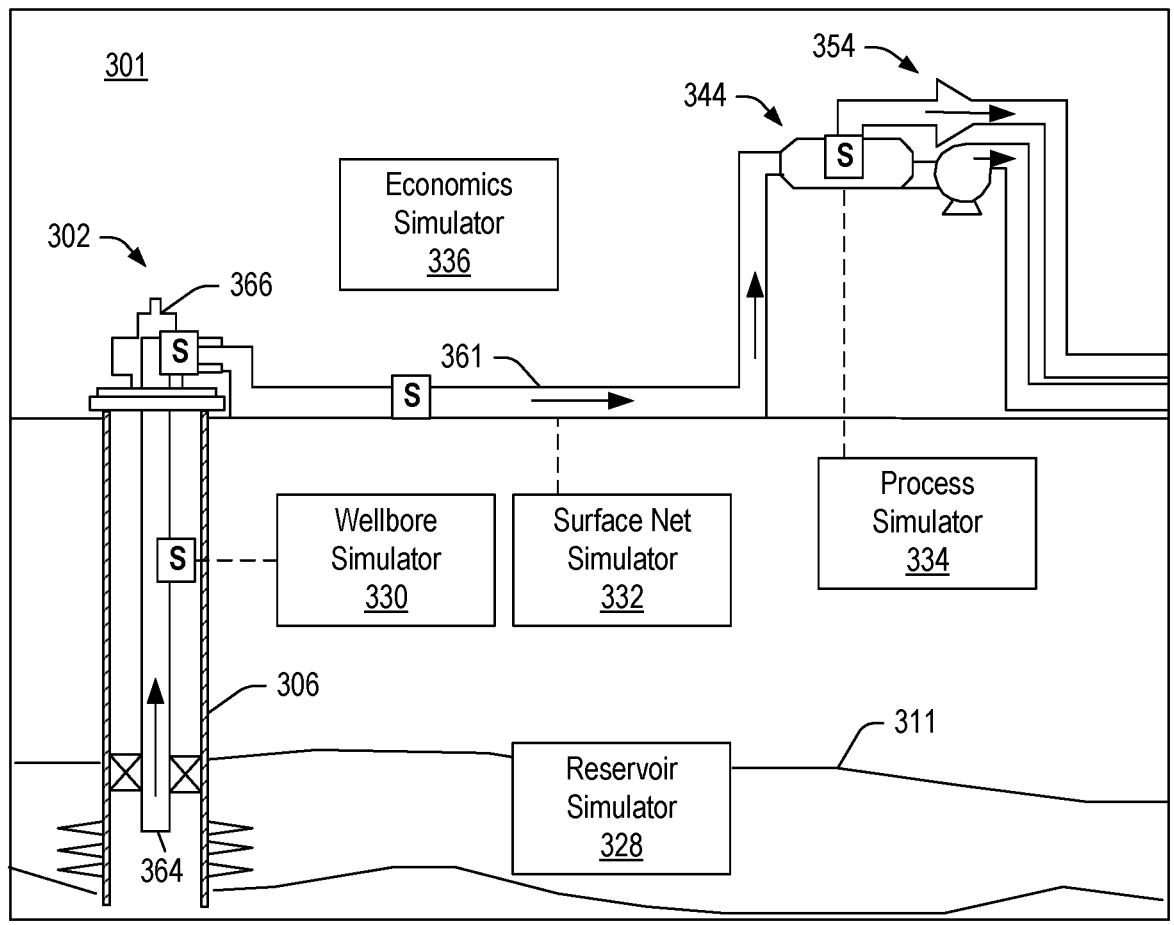
FIG. 3 illustrates an example of a system.

FIG. 3 shows an example of portion of a geologic environment 301 that can include various types of equipment. As shown in FIG. 3, the environment 301 can include a wellsite 302 and a fluid network 344. In the example of FIG. 3, the wellsite 302 includes a wellbore 306 extending into earth as completed and prepared for production of fluid from a reservoir 311.

In the example of FIG. 3, wellbore production equipment 364 extends from a wellhead 366 of the wellsite 302 and to the reservoir 311 to draw fluid to the surface. As shown, the wellsite 302 is operatively connected to the fluid network 344 via a transport line 361. As indicated by various arrows, fluid can flow from the reservoir 311, through the wellbore 306 and onto the fluid network 344. Fluid can then flow from the fluid network 344, for example, to one or more fluid processing facilities.

In the example of FIG. 3, sensors (S) are located, for example, to monitor various parameters during operations. The sensors (S) may measure, for example, pressure, temperature, flowrate, composition, and other parameters of the reservoir, wellbore, gathering network, process facilities and/or other portions of an operation. As an example, the sensors (S) may be operatively connected to a surface unit (e.g., to instruct the sensors to acquire data, to collect data from the sensors, etc.).

In the example of FIG. 3, a surface unit can include computer facilities, such as a memory device, a controller, one or more processors, and a display unit (e.g., for managing data, visualizing results of an analysis, etc.). As an example, data may be collected in the memory device and processed by the processor(s) (e.g., for analysis, etc.). As an example, data may be collected from the sensors (S) and/or by one or more other sources. For example, data may be supplemented by historical data collected from other operations, user inputs, etc. As an example, analyzed data may be used to in a decision making process.

As an example, a transceiver may be provided to allow communications between a surface unit and one or more pieces of equipment in the environment 301. For example, a controller may be used to actuate mechanisms in the environment 301 via the transceiver, optionally based on one or more decisions of a decision making process. In such a manner, equipment in the environment 301 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.).

To facilitate data analyses, one or more simulators may be implemented (e.g., optionally via the surface unit or other unit, system, etc.). As an example, data fed into one or more simulators may be historical data, real time data or combinations thereof. As an example, simulation through one or more simulators may be repeated or adjusted based on the data received.

In the example of FIG. 3, simulators can include a reservoir simulator 328, a wellbore simulator 330, a surface network simulator 332, a process simulator 334 and an economics simulator 336. As an example, the reservoir simulator 328 may be configured to solve for hydrocarbon flow rate through a reservoir and into one or more wellbores. As an example, the wellbore simulator 330 and surface network simulator 332 may be configured to solve for hydrocarbon flow rate through a wellbore and a surface gathering network of pipelines. As to the process simulator 334, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 336 may be configured to model costs associated with at least part of an operation. For example, consider MERAK framework (SLB, Houston, Texas), which may provide for economic analyses.

As an example, a system can include and/or be operatively coupled to one or more of the simulators 328, 330, 332, 334 and 336 of FIG. 3. As an example, such simulators may be associated with frameworks and/or may be considered tools (see, e.g., the system 100 of FIG. 1, etc.). Various pieces of equipment in the example geologic environment 301 of FIG. 3 may be operatively coupled to one or more systems, one or more frameworks, etc. As an example, one or more of the sensors (S) may be operatively coupled to one or more networks (e.g., wired and/or wireless) for transmission of data, which, as explained, may include data indicative of production. As shown, a sensor (S) may be utilized for acquisition of downhole data and/or surface data, which can include data relevant to production (e.g., flow rate, temperature, pressure, composition, etc.). Such data may be utilized in a system such as, for example, the system 100 of FIG. 1 for operational decision making, etc.

Figure 4:
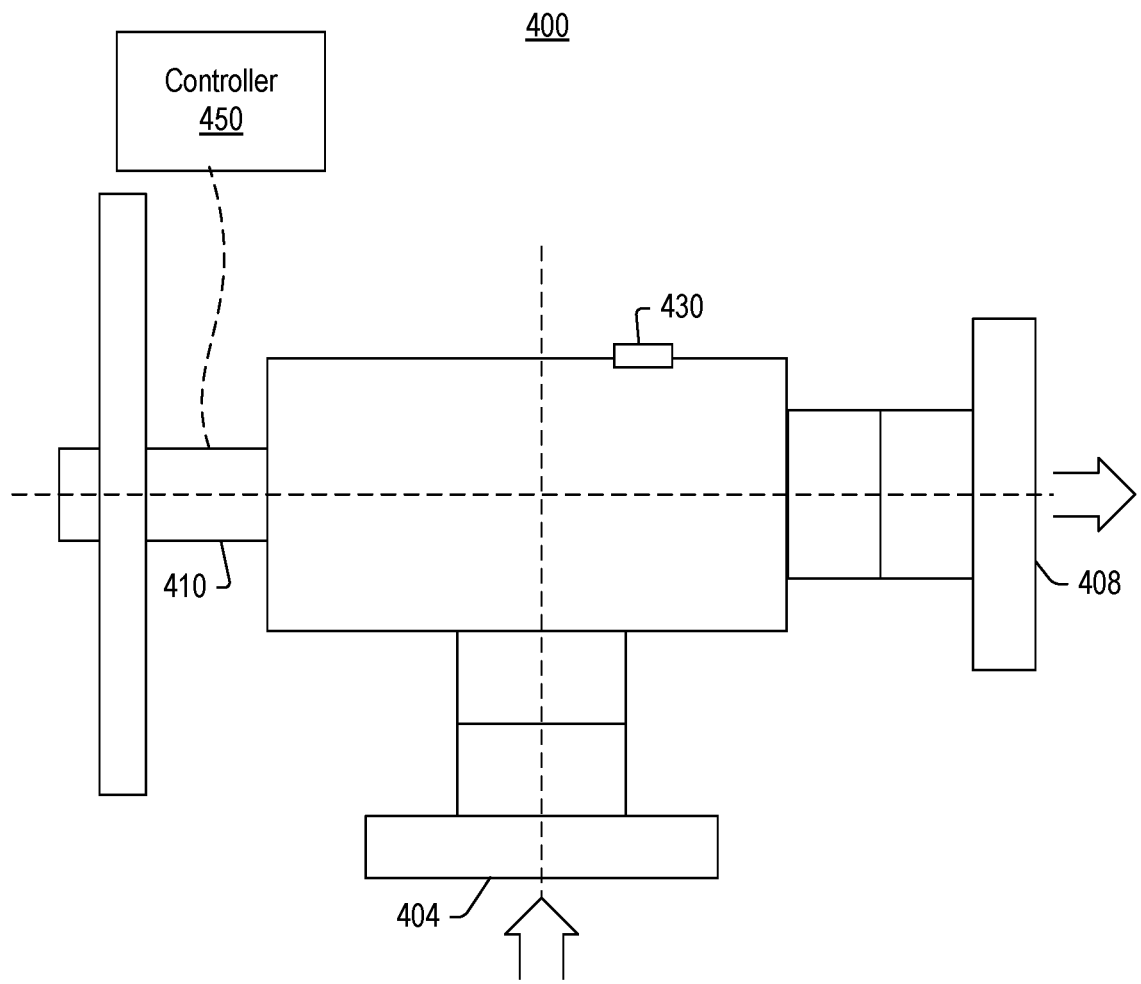
FIG. 4 illustrates an example of a valve.

FIG. 4 shows an example of a choke valve 400. One or more choke valves can be included in a system (see, e.g., the network 240 of FIG. 2). A choke valve can be located on or near a Christmas tree that is used to control the production of fluid from a well (e.g., consider a wellhead choke valve). Opening or closing of a choke valve can influence rate and pressure at which production fluids progress through a pipeline, a process facility, etc. An adjustable choke valve (e.g., an adjustable choke) may be linked to an automated control system to enable one or more production parameters of a well to be controlled.

In the example of FIG. 4, the choke valve 400 includes openings 404 and 408 to corresponding passages where the passages 404 and 408 can be in fluid communication via adjustment of a stem 410, which may be operatively coupled to one or more types of mechanisms. For example, consider a plug and cage mechanism, a needle and seat mechanism, etc.

A plug and cage choke valve can include a plug that is operatively coupled to a stem to move the plug with respect to a cage, which may be a multi-component cage (e.g., consider an inner cage, an outer cage, etc.). In such an example, the cage can include a plurality of openings, which may be of one or more sizes. For example, consider a ring of smaller openings and a ring of larger openings where the different size openings may provide for finer adjustments to flow. In such an example, the plug may first provide for opening of the smaller openings to provide for fluid communication between passages and then, upon further axial translation, provide for opening of the larger openings to provide for more cross-sectional flow area for fluid communication between the passages. As an example, a stem of a plug and cage choke valve can be rotatable where rotation causes axial translation to position the plug with respect to the cage.

A needle and seat choke valve can include a needle portion that can be part of a stem or otherwise operatively coupled to a stem where the stem can be threaded such that rotation causes translation of the needle portion with respect to the seat. When the needle portion is initially translated an axial distance, an annulus is created that causes passages to be in fluid communication. Upon further translation, the needle portion may be completely removed from a bore of the seat such that the annular opening becomes a cylindrical opening, which provides for greater cross-sectional flow area for fluid communication between the passages.

As an example, a choke valve may include one or more sensors that can provide for one or more measurements such as, for example, one or more of position (e.g., stem, needle portion, plug, etc.), flow, pressure, temperature, etc.

As an example, a choke valve may be a unidirectional valve that is intended to be operated with flow in a predefined direction (e.g., from a high pressure side to a lower pressure side).

A choke valve may be selected such that fluctuations in line pressure downstream of the choke valve have minimal effect on production rate. In operation, flow through a choke valve may be at so-called critical flow conditions. Under critical flow conditions, the flow rate is a function of upstream pressure or tubing pressure. For example, consider a criterion where downstream pressure is to be approximately 0.55 or less of tubing pressure.

As an example, a multiphase choke equation may be utilized to estimate the flowing wellhead pressure for a given set of well conditions along with suitable multiphase choke coefficients (e.g., Gilbert, Ros, Baxendell, Achong, etc.), which may include a number of coefficients (e.g., $A_1$, $A_2$ and $A_3$). For example, consider the following equation with parameter values inserted, as explained below.

$$\rho_{wh}=(3.86\times10^{-3}(400)(800)^{0.546})/((12/64)^{1.89})=1,405 \text{ psia}$$

In the foregoing equation, which may be used to estimate flow rate or choke diameter, the well is producing 400 STB/D of oil with a gas-liquid ratio of 800 Scf/STB where the choke size is 12/64 inch and the Gilbert coefficients are $3.86\times10^{-3}$, 0.546 and 1.89, respectively. As indicated, the estimated flowing wellhead pressure is 1,405 psia. In an example using the Ros choke equation, an estimated flowing wellhead pressure of 1,371 psia is calculated.

Parameters that can be utilized in various computations include discharge coefficient (Cd), pipe diameter (d), pipe length (L), specific heat capacity ratio (k) (e.g., Cp/Cv), standard pressure (psc), wellhead pressure (pwh), gas flow rate (qg), liquid flow rate (ql), standard temperature (Tsc), wellhead temperature (Twh), ratio of downstream pressure to upstream pressure (y), gas compressibility factor (z), gas specific gravity (yg), etc.

In the example of FIG. 4, the choke valve 400 includes a port 430 that may be utilized for monitoring pressure. As shown in FIG. 4, a controller 450 may be utilized to control the stem 410. For example, consider a motor that can be operatively coupled to the stem 410 such that the motor can be controlled to adjust the stem 410 (e.g., to adjust the shape and size of the opening or openings between the passages 404 and 408, etc.).

As an example, a system can utilized one or more choke formulas. For example, consider a semi-analytical approach as may be utilized for oil and gas well rate estimation. An article by Kargarpour, entitled "Oil and gas well rate estimation by choke formula: semi-analytical approach", Journal of Petroleum Exploration and Production Technology (2019) 9:2375-2386, is incorporated by reference herein.

In various instances, a lack of continuous well production rate measurements can lead to untimely (e.g., late) detection of production deferment. Further, various workflows may not be amenable to automation without real time production rates. Production rates can be useful for various purposes such as, for example, gas injection, water injection, chemical injection, etc.

As an example, a method may utilize an equation that can be semi-empirical and data driven to provide flow rates based on real time pressure measurements. Such an equation may be referred to as a model, however, it may lack a physical basis in that it relies on one or more parameters where values thereof are calibrated and may be re-calibrated.

As an example, an equation can be part of a virtual flow meter (VFM) that may be adaptable to a particular piece of equipment such as a flow device. A flow device may be a device that can act to control fluid flow. For example, consider a choke valve. As an example, a choke VFM may provide for estimating flow rate through a choke region of a flow device using an upstream pressure measurement and a downstream pressure measurement. Such a VFM may include two real time inputs (pressure) and one or more other inputs that may be available less frequently (e.g., flow device characteristic dimension, parameter values, etc.).

As an example, a VFM may be automatically re-calibrated. For example, an autonomous process can provide for automated re-calibrations for changing conditions. As an example, a VFM may calculate real time single and/or multiphase liquid flow rate (e.g., in a liquid agnostic manner, etc.). As an example, a VFM may provide for calculation of oil production phases using measured water cut (WC). As an example, a VFM may provide for detect of a production loss earlier than without the VFM. For example, consider detection of one or more abnormalities in oil production, gas injection, water injection, chemical injection, etc. As an example, a VFM may be deployable locally and/or remotely (e.g., cloud and/or edge, etc.). As an example, a VFM or VFMs may provide output to one or more frameworks. For example, consider a framework or frameworks that may be available within the DELFI environment.

As an example, a system can include one or more multiphase flow meters, which may be installed permanently and/or on an as-desired basis. As an example, a multiphase flow meter can include one or more features of the Vx SPECTRA surface multiphase flow meter (SLB, Houston, Texas). Such a flow meter can utilize a spectrum analysis to accurately measure oil, gas, and water flow rates without phase separation. A multiphase flow meter can be utilized to measure various pressures, though it can introduce a pressure drop into a system. Such a flow meter tends to be costly and demanding of attention, in addition to introducing a pressure drop. As such, a single flow meter may be transported from location to location to acquire various multiphase flow meter measurements. As an example, the AVOCET production operations framework may be operatively couple to a multiphase flow meter such as, for example, the Vx SPECTRA surface multiphase flow meter. In such an example, data may be acquired by the AVOCET framework and/or one or more signals transmitted to the flow meter.

As an example, a system can include a virtual flow meter framework, which may provide for flow estimations without using a physical flow meter. As an example, a virtual flow meter can be a choke virtual flow meter (VFM) that can facilitate gas lift optimization, optionally in an automated manner. As an example, a VFM may be integrated into or operatively coupled to one or more frameworks such as, for example, the AVOCET production operations framework and/or one or more other frameworks. The AVOCET framework can acquire, store, display, etc., production operations information (e.g., surface, wellbore, wellhead, and facilities data, measurements such as well test data, fluid analyses, transfer tickets, and tank inventories, etc.) for one or more purposes (e.g., tracking forecasts, production targets, budgets, etc.). The AVOCET framework may be utilized in various cross-domain workflows and may be integrated with one or more other frameworks, environments, etc. The AVOCET framework can provide for handling of equipment, operations, etc., whether at a single site or at multiple sites.

As an example, a VFM can be a choke VFM that may, for example, be utilized for one or more purposes. As an example, one or more instances of choke VFMs may be utilized in gas lift operations, for example, to optimize gas lift. In such an example, an autonomous gas lift optimization system may be implemented that can provide for optimizing injection of lift gas and increasing production from one or more wells.

As an example, a VFM may be utilized for one or more types of equipment where a restriction may be present such as an adjustable restriction. For example, a valve can include an adjustable restriction that can regulate flow. Such a valve may be a water valve, an oil valve, a valve for a composition, etc. As an example, a water valve may be involved in one or more water related operations such as, for example, water flooding. In various examples, a VFM may be utilized in place of or in addition to a physical flow meter. As an example, a VFM may be a back-up for a physical flow meter, a physical flow meter may provide for calibrating a VFM or VFMs, etc.

A U.S. Provisional Application having Ser. No. 63/279, 832, filed 16 Nov. 2021, entitled Calibrated Virtual Flow Meter, is incorporated by reference herein in its entirety. The '832 application provides various examples of a VFM and other equipment along with various examples of techniques.

Figure 5:
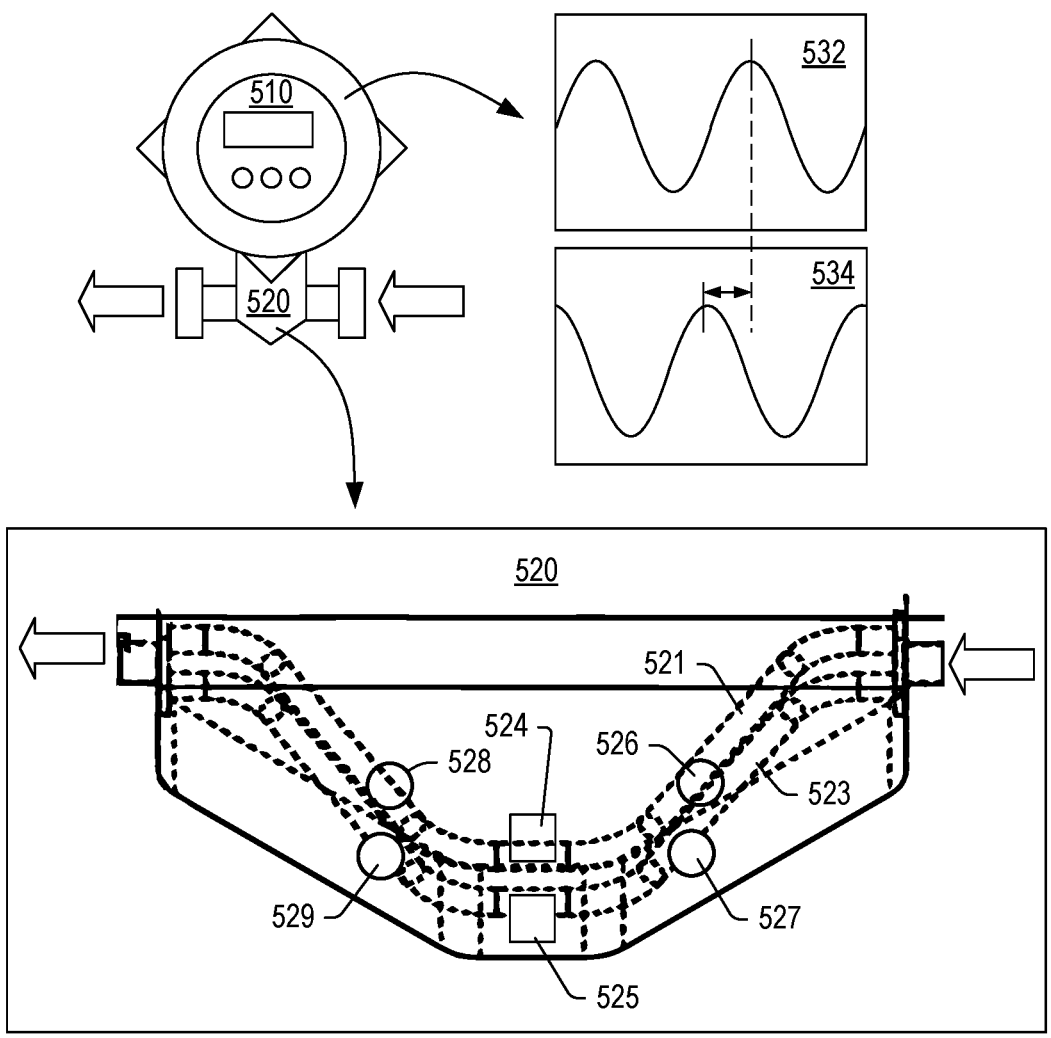
FIG. 5 illustrates an example of a physical flow meter.

FIG. 5 shows an example of a flow meter 500 that includes circuitry 510 and a U sensor tube assembly 520. As shown, the U sensor tube assembly 520 includes a pair of U sensor tubes 521 and 523 along with various driver components 524 and 525 and various sensor components 526, 527, 528 and 529.

A mentioned, a system can include one or more types of flow meters. A flow meter can be a type of meter that can measure fluid flow and that can optionally measure one or more other types of physical characteristics and/or phenomena (e.g., pressure, temperature, density, vibration, orientation, etc.).

As shown in FIG. 5, the flow meter 500 can include one or more sensor tubes (e.g., U sensor tubes, etc.) 521 and 523. For example, consider the flow meter 500 as including the pair of U sensor tubes 521 and 523 that can be provided with a split of incoming flow where the U sensor tubes 521 and 523 oscillate at a natural resonant frequency via the driver components 524 and 525. In such an example, the flow meter 500 can include the sensor components 526, 527, 528 and 529 as magnet and coil assembly pickoffs that can measure voltage amplitudes with respect to time (e.g., sine waves, etc.). When fluid flows in the pair of U sensor tubes 521 and 523, the Coriolis force causes each of the U sensor tubes 521 and 523 to twist in opposition to each other, which results in a phase shift for voltage amplitudes with respect to time (e.g., phase shifted sine waves), which are shown in the plots 532 and 534. In such an example, a time delay between phases can be measured in microseconds where the time delay is proportional to the mass flow rate (e.g., a greater time delay can correspond to a greater mass flow rate). In such an example, frequency can be measured where frequency can provide an indication of density. For example, consider Hooke's law where a tube can be a spring and mass of a tube and fluid therein can be considered a mass coupled to the spring. In such an example, density can be estimated as being proportional to the inverse of the frequency squared. As an example, volumetric flow can be determined from mass flow rate and density (e.g., volumetric flow rate=mass flow rate/density).

A flow meter may be characterized by a flow rate turndown ratio (e.g., up to 100:1 or more, etc.). A flow meter may be rated as to temperature and can include one or more temperature sensors. As an example, a flow meter may be suitable for operation over a range of temperatures from minus 200 degrees C. to plus 350 degrees C. A flow meter may include one or more types of interfaces, busses, etc.

As an example, a flow meter can include circuitry that can measure flow over a range of flow rates. For example, consider a range with a lower limit that can be as low as zero and an upper limit that can be as high as, for example, 400,000 barrels per day (BPD) or more.

As an example, a flow meter can be rated with an uncertainty. For example, consider a flow rate uncertainty on liquids of approximately +/−0.1 percent (e.g., +/−zero stability error). As to density, consider, for example, a density uncertainty of approximately +/−0.0005 g/ml.

As an example, a flow meter can be constructed of various different materials where one or more of the materials can be exposed to fluid and considered to be fluid-wetted. As an example, a flow meter can include one or more fluid-wetted materials such as, for example, one or more of a stainless steel and an alloy (e.g., consider 316/316L SST or Alloy C22).

As an example, a flow meter may be suitable for use in one or more types of hazardous areas where a hazardous area may be characterized according to one or more standards (e.g., CSA, ATEX/IECEx). In North America, hazardous locations can be defined by a combination of classes and divisions or zones, for example, as follows: Class I (a location made hazardous by the presence of flammable gases or vapors that may be present in the air in quantities sufficient to produce an explosive or ignitable mixture); Class II (a location made hazardous by the presence of combustible or electrically conductive dust); Class III (a location made hazardous by the presence of easily ignitable fibers or flyings in the air, but not likely to be in suspension in quantities sufficient to produce ignitable mixtures); Division 1 (a location where a classified hazard exists or is likely to exist under normal conditions); Division 2 (a location where a classified hazard does not normally exist but is possible to appear under abnormal conditions); Zone 0 (an area in which an explosive gas atmosphere is continuously present for a long period of time); Zone 1 (an area in which an explosive atmosphere is likely to occur in normal operation); Zone 2 (an area in which an explosive gas atmosphere does not normally exist); etc.

As an example, a flow meter can include circuitry that can perform I/O counts, for example, consider one or more of dual independent pulse outputs, dual independent analog outputs, status input, and status output.

Figure 6:
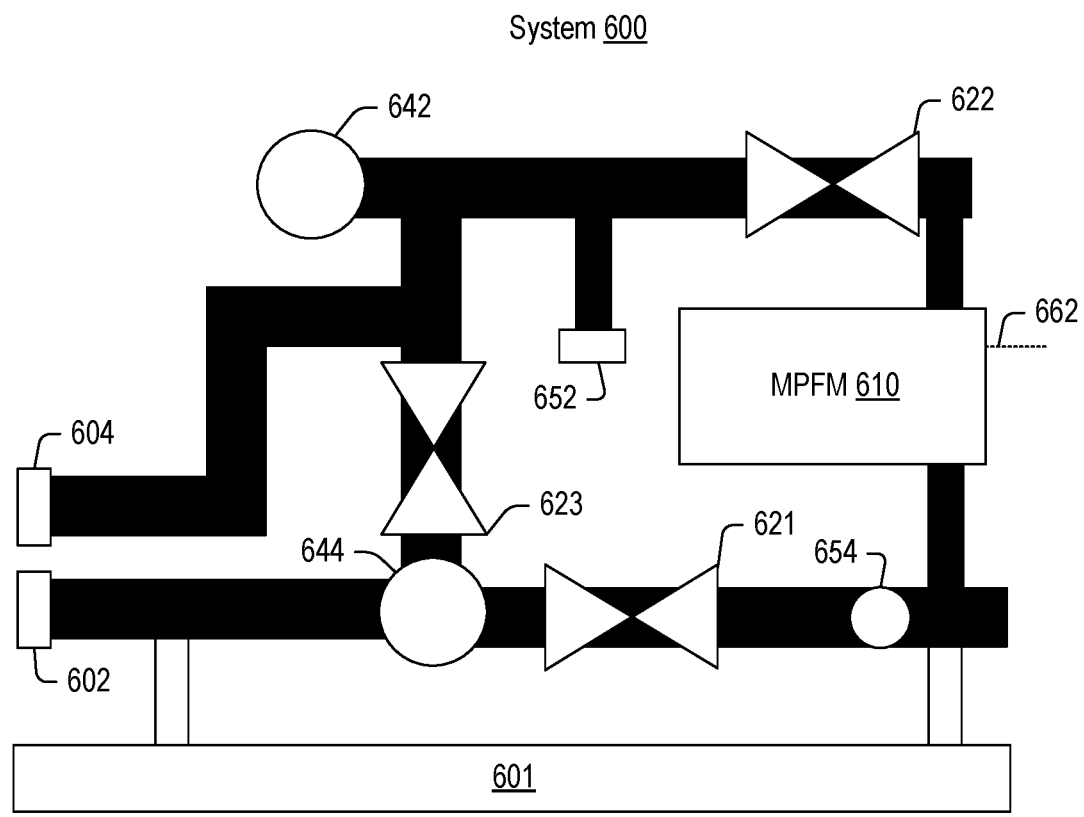
FIG. 6 illustrates an example of a system that includes an example of a physical flow meter.

FIG. 6 shows an example of a system 600 that includes a multiphase flow meter (MPFM) 610 as a physical flow meter. As an example, a physical flow meter can be a multiphase flow meter. For example, consider the Vx SPECTRA surface multiphase flow meter (SLB, Houston, Texas). The Vx SPECTRA flow meter includes a venturi section and multivariable transmitter for measuring total flow rate; a nuclear source and detector that obtain oil, gas, and water holdups; and a compact flow computer that performs computations and converts flow measurements from line to standard conditions. The Vx SPECTRA flow meter uses full-gamma spectroscopy to accurately capture multiphase flow dynamics for real-time monitoring and analysis.

The Vx SPECTRA flow meter can include an embedded computer running a real time operating system that can handle data from instrumentation of the flow meter. The embedded computer can run an interpretation model and handle external communications. The embedded computer can provide for adjusting one or more parameters that may be calibration parameters. As an example, a calibration can include adjusting one or more physical components of a flow meter.

A flow meter can include a radioactive source such as, for example, a $^{133}$Ba radioactive source. Such a flow meter can include pressure barriers made of extremely hard ceramic to support line pressure but also transparent to the $^{133}$Ba radiation path across the Venturi throat. A source capsule can be installed in a source holder, shielded with tungsten, which can be an external source shielding made of tungsten where a stainless steel source holder contains a small capsule of $^{133}$Ba. A gamma detector can be included that generates a high voltage internally (700 volt initially, up to 1,800 volt D.C.) within a low amperage; noting that electrical shock hazard can exist. As a flow meter can include radioactive material and high voltage circuitry, servicing can be restricted to trained and licensed individuals.

As explained, a flow meter can include various components, which may be physical hardware components, circuitry components, radioactive components, etc. As an example, a flow meter can include one or more models, which may include model parameters. As an example, one or more types of parameters (e.g., physical, electrical, firmware, software, etc.) may be adjustable for purposes of calibration of a flow meter.

As shown in FIG. 6, the MPFM 610 can be mounted on a portable skid 601 that can facilitate delivery and removal. The system 600 can include various conduits, including inlets, outlets, valves, sampling ports, flow connectors, wire connectors, etc. For example, the system 600 can include an inlet port 602, an outlet port 604, valves 621, 622 and 623, flow connectors 642 and 644, and fluid sampling ports 652 and 654. As shown in FIG. 6, one or more connections 662 can be made to the MPFM 610, which can include connections for one or more of power and data (see, e.g., dotted line).

As an example, a field can include multiple sites where multiple MPFMs are installed. For example, consider a field with more than 60 MPFMs. In such an example, a crew of two to five people may be tasked with traveling to the sites to service the MPFMs according to a schedule. For example, consider a 60 day schedule such that each of 60 MPFMs can be serviced every 60 days. As an example, servicing can include calibrating. For example, a crew can perform various tests to measure flow and compare to MPFM measured flow to be able to then calibrate a MPFM and/or its measurements. In some instances, a crew may visit and an MPFM may be found to be suitably calibrated, hence, the crew visit may be considered non-productive time (NPT).

As an example, a method can include utilizing a virtual flow meter (VFM) to trigger a calibration request for a flow meter (e.g., MPFM or other type of flow meter). In such an example, a crew may respond to calibration requests rather than operate according to a schedule or respond to requests while on a relaxed schedule.

As an example, a method can include executing an edge application for one or more flow meters (e.g., MPFM, etc.) for operations optimization. Such a method can address one or more operational inefficiencies related to flow metering in the field.

As explained, operators can install permanent MPFMs to get continuous and reliable flow rates from wells or manifolds (connected to multiple wells). MPFMs tend to be sensitive measurement instruments that demand recalibration with change in operational parameters and composition of production fluids. As an example, an operator can be provided with a pre-defined calibration program with a fixed frequency of calibration operations for each MPFM (e.g., 2 to 4 months). At various sites, an MPFM may not be connected to a digital infrastructure such that an operator of a well relies on service personnel to provide regularly updated reports (e.g., daily) from each MPFM.

A well operator, which may operate a number of wells in a field, can contract a service provider where the well operator may pay for calibration of some MPFMs that do not require calibration and other MPFMs that do require calibration, yet may continue to operate and provide inaccurate flowrates.

In a moderate sized field with a production of approximately 150K BOPD, there may be approximately 35 MPFMs in operation. A service provider may charge a reporting and calibration cost of over 100,000 USD per month, which is an annual cost of 1,200,000 USD. A method that can help to optimize a calibration schedule may result in a cost reduction of 20 percent or more. Further, such a method can improve data, reduce energy expenditures, decision making and control. For example, a method can include predicting a time to calibration based at least in part on outputs of a virtual flow meter (VFM) and a physical flow meter (PFM). For example, data from a VFM and from a PFM can be compared and analyzed, for example, to determine trends where one or more thresholds may be utilized to trigger scheduling of a calibration of the PFM.

As an example, data from a field may be acquired and processed using one or more machine learning models (ML models), which can include one or more regression models that can make predictions as to when a PFM will be out of calibration to an extent that demands re-calibration. In such an approach, a schedule can be generated that may extend out for a number of days or months. Given such a schedule, resources can be provisioned, which may be in a just-in-time (JIT) manner or another manner that may comport with LEAN practices.

As to one or more thresholds that may be used to trigger a call for calibration (e.g., re-calibration), consider a threshold that can depend on whether a PFM is at a well or at a manifold. As an example, PFMs for wells that produce fluids that flow to a manifold can be utilized to determine whether a PFM at the manifold is properly calibrated. As an example, VFMs for wells that produce fluids that flow to a manifold can be utilized to determine whether a PFM at the manifold is properly calibrated, noting that a VFM may be established for the manifold.

As an example, a method can employ at least two flow estimation solutions that are independent where such a method can improve operational efficiency of multiphase flow measurements operations. For example, a method can provide for identification and prioritization of MPFMs that can benefit from calibration. As an example, a method can utilize a system that includes one or more edge-based virtual flow meters (VFMs) that can provide measurements at a wellsite that can be compared with MPFM flow rates in real time. In such an example, a real-time threshold ratio between MPFM rates and VFM rates can be established to continuously provide feedback on quality of MPFM measurements. In such an approach, when a set threshold is breached, the system can issue a notification (e.g., a flag, a trigger, etc.) that indicates that a MPFM is in need of calibration.

As an example, a system can provide for real-time data transmission for VFMs and MPFMs, which may be via satellite connectivity and/or SCADA; noting that historical data analysis and trends for both VFM and MPFM flow rates and operational parameters can be stored to memory, locally and/or remotely.

As mentioned, one or more techniques may be employed for prediction of estimated time before a next MPFM calibration. For example, historical threshold data can be utilized for training one or more ML models that can predict the time at which one would expect an MPFM to breach a threshold. Such an approach can allow operators to plan operations more effectively.

As an example, a method can provide for automatic calibration of a MPFM using an edge application. For example, a MPFM or other PFM can be remotely calibrated through a remote loading of calibration parameters via an edge gateway. In such an approach, an automatic MPFM calibration application can be hosted on the edge gateway that will automatically or through remote access allow for the calibration of MPFM. Such an application may also work autonomously and use VFM data to calibrate MPFM in the field. Further, an edge application can sync with one or more actuated chokes and/or valves to provide a multi-point calibration in real-time.

As an example, a method can provide for estimation of rate uncertainty. For example, a threshold can be estimated in real-time and MPFM parameters can be used to also estimate an uncertainty range in MPFM derived flow rates. Such information can further assist in improving production allocations and getting a better understanding of production operations.

Figure 7:
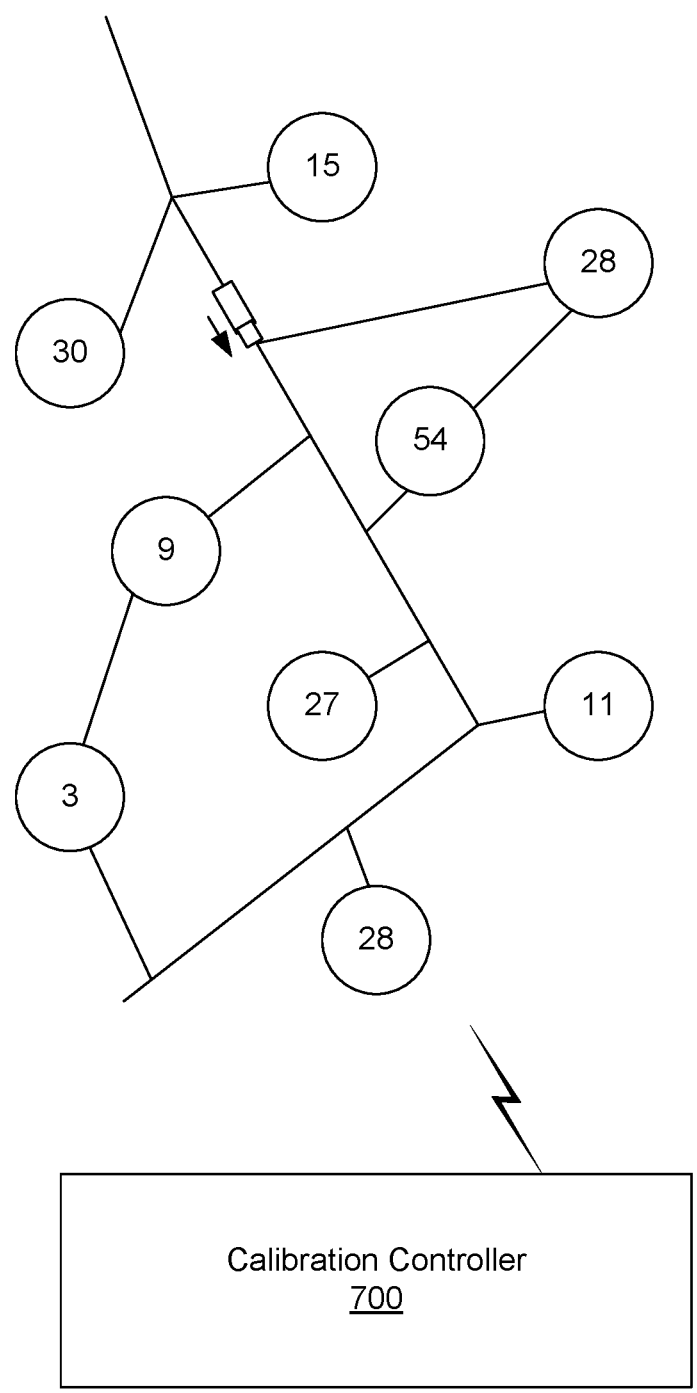
FIG. 7 illustrates an example of a calibration controller.

FIG. 7 shows an example of a field with various site with one or more PFMs and one or more VFMs where a calibration controller 700 can predict a time to calibration for each of the sites, which may be in days, as indicated in the circles that represent the different sites. In such an example, the calibration controller 700 can provide for scheduling of calibrations via one or more networks and/or via one or more site visits. As to site visits, the calibration controller 700 can consolidate various sites using one or more techniques and/or one or more criteria. For example, consider a time difference such as sites within a span of four days can be consolidated. In such an example, the two sites indicating 9 days and 11 days can be consolidated and the three sites indicating 27 days and 28 days can be consolidated. Such an approach can conserve energy such as energy to transport a crew to the sites, which may be visited in a single day. As an example, a crew may be able to service a limited number of sites in a single day, which may depend on distance to be traveled. As an example, the calibration controller 700 can take into account such factors as criteria to optimize use of a crew. Other factors may include type of PFM or PFMs at a site. For example, a crew may be skilled or contracted to service a particular type of PFM or particular types of PFMs. As an example, weather conditions may be taken into account, including forecasts.

In the example of FIG. 7, cloud services may be utilized for performing various tasks where the cloud services can be in communication with local services at the wellsites of the wells. As an example, various features may be local and/or remote. For example, some features illustrated with respect to the cloud service may be provided locally, where resources, techniques, technologies, etc., are available.

As an example, a system can provide for various types of simulation such as, for example, reservoir simulation, wellbore simulation, surface network simulation, integrated simulation, etc. As an example, the wellsites can include sensors that can acquire measurements where such measurements may be utilized locally and/or remotely. For example, consider measurements that can be obtained for derived flow rate, proxy models, simulation models, etc.

As an example, a system can include and/or utilized features of one or more cloud platforms (e.g., GOOGLE CLOUD, AMAZON WEB SERVICES CLOUD, AZURE CLOUD, etc.). As an example, the DELFI cognitive exploration and production (E&P) environment may be implemented at least in part in a cloud platform.

As explained, choke valves (e.g., chokes) can be present in various field installations such as, for example, at wellsites to control a well. Where a downhole pump is present such as, for example, an electric submersible pump (ESP), the pump may provide features for flow control such that a choke valve is not necessary for flow control.

As explained, a choke valve can be defined via a flow parameter such as cross-sectional area of a constriction region (e.g., a "choke"), which may be represented by a diameter (e.g., an actual diameter or an effective diameter). In a choke valve, flow is expected to pass through the choke such that a choke valve can control production of fluid.

As an example, the following equation may be utilized for flow:

$$Q = a * \frac{P1^b * (P1-P2)^c * d^2}{GLR^e}$$

In the forgoing equation, P1 and P2 can be real time pressure measurement values, d is a diameter of a choke, and GLR is a gas to liquid ratio (e.g., an oil ratio if the water cut (WC) is zero). The various parameters a, b, c and e can be determined and set, which may characterize behavior of a choke. For example, a change to one or more of the parameters can provide a signature for a particular choke.

The foregoing equation provides for estimating flow (e.g., flow rate) through a choke valve, which can provide for optimization of injection and for increasing production from a well. As an example, an equation such as the foregoing equation may be utilized in a simulation. For example, consider receiving trending data (e.g., real time data) and outputting flow rates. In such an example, as time progresses, the output can reflect (e.g., simulate) the performance of a physical flow meter (e.g., a Vx SPECTRA flow meter, etc.).

As an example, a system can operate without input (e.g., ongoing input, full-time presence of, etc.) from a physical flow meter (e.g., a Vx SPECTRA flow meter, etc.). Such a system can help to reduce various costs, losses, etc., as may be associated with operation of a physical flow meter.

As an example, a field site can include pressure gauges. For example, consider pressure gauges that can provide pressure measurements P1 and P2. In such an example, the pressure gauges can be electronic and provide for output of signals indicative of measured pressures. For example, consider a digital pressure gauge and/or an analog and digital pressure gauge (e.g., including an analog to digital converter). As an example, field equipment may include a network device such as, for example, a gateway that can receive signals from various pieces of equipment, which may include one or more pressure gauges. As an example, a field site can include pressure gauges that can acquire pressure measurements in real time such that real time data are available (e.g., real time edge data, etc.).

As an example, a VFM may be implemented as a set of instructions that can operate in the field at a field device. For example, consider an edge application that is a choke VFM that can operate on input such as, for example, pressure measurements (e.g., P1 and P2) from two pressure gauges. Such pressure measurements can be live to provide trending data to an edge framework and/or a cloud framework where a rate may be output (e.g., a flow rate, etc.). Such output may be utilized in the field, whether generated in the field and/or generated remotely and transmitted to the field, which may be in the form of a control action, etc. While various examples refer to artificial lift (e.g., gas lift via gas injection), a VFM may be utilized for one or more purposes (e.g., water injection, chemical injection, etc.).

Figure 8:
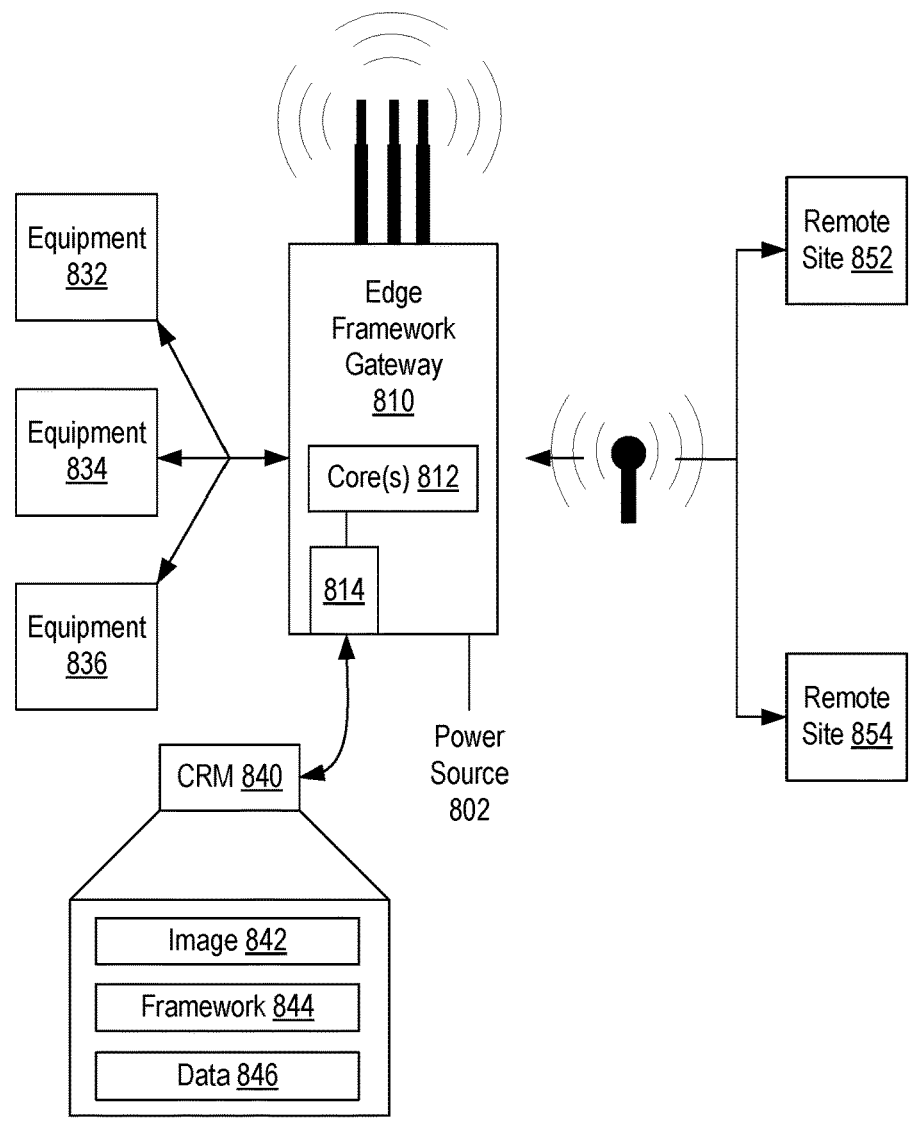
FIG. 8 illustrates an example of a system.

FIG. 8 shows an example of a system 800 and an example of an architecture 801. As shown, the architecture 801 can provide for site or sites injection and/or production optimization, which can be via one or more VFMs (e.g., choke VFMs, etc.). For example, the architecture 801 can generate one or more results (e.g., control actions, etc.) that can be utilized for calibration operations. In such an example, the result or results may be generated locally and/or remotely (e.g., depending on number of sites, resources, etc.). As shown, the architecture 801 can include one or more models. As explained, a model can include a driving force term or terms. An example of a driving force can be a pressure differential as may be represented by two pressure measurements (e.g., P1 and P2). The architecture 801 may include one or more physics models, one or more machine learning models, etc. As shown, the architecture 801 includes an interface for real time data, optionally an interface for ad hoc data, and a calibration component. The result(s) component may include a result interface where an output result can be a control trigger, a control instruction, etc., that can call for an action or actions by a piece or pieces of equipment. As an example, the system 800 can include features to implement the calibration controller 700 of FIG. 7.

As shown, the system 800 can include a power source 802 (e.g., solar, generator, grid, etc.) that can provide power to an edge framework gateway 810 that can include one or more computing cores 812 and one or more media interfaces 814 that can, for example, receive a computer-readable medium 840 that may include one or more data structures such as an image 842, a framework 844 and data 846. In such an example, the image 842 may be an operating system image that can cause one or more of the one or more cores 812 to establish an operating system environment that is suitable for execution of one or more applications. For example, the framework 844 may be an application suitable for execution in an established operating system in the edge framework gateway 810. As an example, the framework 844 may be suitable for performing tasks associated with the architecture 801. For example, consider tasks associated with utilization of one or more models, setting one or more parameters of a calibration, generating one or more results based at least in part on one or more models, etc.

In the example of FIG. 8, the edge framework gateway 810 ("EF") can include one or more types of interfaces suitable for receipt and/or transmission of information. For example, consider one or more wireless interfaces that may provide for local communications at a site such as to one or more pieces of local equipment 832, 834 and 836 and/or remote communications to one or more remote sites 852 and 854. As an example, the local equipment 832, 834 and 836 can include one or more pressure gauges.

As an example, the EF 810 may be installed at a site that is some distance from a city, a town, etc. In such an example, the EF 810 may be accessible via a satellite communication network.

A communications satellite is an artificial satellite that relays and amplifies radio telecommunication signals via a transponder. A satellite communication network can include one or more communication satellites that may, for example, provide for one or more communication channels. As of 2021, there are about 2,000 communications satellites in Earth orbit, some of which are geostationary above the equator such that a satellite dish antenna of a ground station can be aimed permanently at a satellite rather than tracking the satellite.

High frequency radio waves used for telecommunications links travel by line-of-sight, which may be obstructed by the curve of the Earth. Communications satellites can relay signal around the curve of the Earth allowing communication between widely separated geographical points. Communications satellites can use one or more frequencies (e.g., radio, microwave, etc.), where bands may be regulated and allocated.

Satellite communication tends to be slower and more costly than other types of electronic communication due to factors such as distance, equipment, deployment and maintenance. For wellsites that do not have other forms of communication, satellite communication can be limiting in one or more aspects. For example, where a controller is to operate in real-time or near real-time, a cloud-based approach to control may introduce too much latency. As shown in the example of FIG. 8, the EF 810 may be deployed where it can operate locally with one or more pieces of equipment 832, 834, 836, etc., which may be for purposes of control.

As desired, from time to time, communication may occur between the EF 810 and one or more remote sites 852, 854, etc., which may be via satellite communication where latency and costs are tolerable. As an example, the CRM 840 may be a removable drive that can be brought to a site via one or more modes of transport. For example, consider an air drop, a human via helicopter, plane or boat, etc.

As to an air drop, consider dropping an electronic device that can be activated locally once on the ground or while being suspended by a parachute en route to ground. Such an electronic device may communicate via a local communication system such as, for example, a local WiFi, BLUETOOTH, cellular, etc., communication system. In such an example, one or more data structures may be transferred from the electronic device (e.g., as including a CRM) to the EF 810. Such an approach can provide for local control where one or more humans may or may not be present at the site. As an example, an autonomous and/or human controllable vehicle at a site may help to locate an electronic device and help to download its payload to an EF such as the EF 810. For example, consider a local drone or land vehicle that can locate an air dropped electronic device and retrieve it and transfer one or more data structures from the electronic device to an EF, directly and/or indirectly. In such an example, the drone or land vehicle may establish communication with and/or read data from the electronic device such that data can be communicated (e.g., transferred to one or more EFs).

As an example, a system may include and/or provide access to various resources that may be part of an environment such as, for example, the DELFI environment (see, e.g., FIG. 1). For example, consider the PIPESIM framework, which may be implemented locally and/or remotely (e.g., as a full and/or as a tailored framework). As an example, the PIPESIM framework and/or other framework may be utilized for one or more purposes, which may include calibration, generation of results, etc. As an example, a framework such as the PIPESIM framework may provide for comparisons between output of a semi-empirical model or models and output of the PIPESIM framework.

As an example, an EF may include a license server, a semi-empirical model(s) component, a framework simulation engine (e.g., a PIPESIM engine, etc.) and a REST API where the REST API can receive one or more API calls, for example, as one or more model requests, calibration requests, simulation requests, etc. As an example, an EF may respond to an API call with output where such output may be provided to one or more edge applications, pieces of equipment, etc. (e.g., for individual and/or coordinated control of one or more sets of equipment, etc.).

Referring again to the architecture 801, as explained, one or more physics-based models can be deployed to an edge for implementation, for example, to operate responsive to real-time data for one or more types of equipment control. As an example, a fluid simulation framework such as the PIPESIM framework may be implemented in an edge manner. Such a fluid simulation framework can be a multiphase flow simulation framework suitable for handling multiphase flow that may occur in one or more types of oil and/or gas field operations.

As an example, one or more types of frameworks may be utilized for a virtual flow meter (VFM). For example, a framework can include sets of conservation equations for mass momentum and energy describing single, two or three phase flow (e.g., according to one or more of a LEDAFLOW (Kongsberg Oil & Gas Technologies AS, Sandvika, Norway), OLGA model (SLB, Houston, Texas), TUFFP unified mechanistic models (Tulsa University Fluid Flow Projects, Tulsa, Oklahoma), etc.). As an example, a framework can include a simulator such that flow simulation can be performed, which may be for multiphase fluid flow.

As shown in FIG. 8, an EF may execute within a gateway such as, for example, an AGORA gateway (e.g., consider one or more processors, memory, etc., which may be deployed as a "box" that can be locally powered and that can communicate locally with other equipment via one or more interfaces). As an example, a gateway can include one or more features of an AGORA gateway (e.g., v.202, v.402, etc.) and/or another gateway. For example, consider an INTEL ATOM E3930 or E3950 Dual Core with DRAM and an eMMC and/or SSD. Such a gateway may include a trusted platform module (TPM), which can provide for secure and measured boot support (e.g., via hashes, etc.). A gateway may include one or more interfaces (e.g., Ethernet, RS485/422, RS232, etc.). As to power, a gateway may consume less than about 100 W (e.g., consider less than 10 W or less than 20 W). As an example, a gateway may include an operating system (e.g., consider LINUX DEBIAN LTS). As an example, a gateway may include a cellular interface (e.g., 4G LTE with Global Modem/GPS, etc.). As an example, a gateway may include a WIFI interface (e.g., 802.11 a/b/g/n). As an example, a gateway may be operable using AC 100-240 V, 50/60 Hz or 24 VDC. As to dimensions, consider a gateway that has a protective box with dimensions of approximately 10 in×8 in×4 in.

As an example, a gateway may be part of a drone. For example, consider a mobile gateway that can take off and land where it may land to operatively couple with equipment to thereby provide for control of such equipment. In such an example, the equipment may include a landing pad. For example, a drone may be directed to a landing pad where it can interact with equipment to control the equipment. As an example, a wellhead can include a landing pad where the wellhead can include one or more sensors (e.g., temperature and pressure) and where a mobile gateway can include features for generating fluid flow values using information from the one or more sensors. In such an example, the mobile gateway may issue one or more control instructions (e.g., to a choke valve, a pump, etc.).

As an example, a gateway may include hardware (e.g. circuitry) that can provide for operation of a drone. As an example, a gateway may be a drone controller and a controller for other equipment where the drone controller can position the gateway (e.g., via drone flight features, etc.) such that the gateway can control the other equipment.

As an example, a VFM can operate independent of a PFM and can provide relatively stable data indicative of flow rates. Output from a VFM may be less susceptible to changes in fluid properties and one or more other types of changes. In contrast, a PFM may be more sensitive to changes such that flow rates output by a PFM may vary in terms of accuracy when one or more types of changes occur in fluid and/or an environment (e.g., ambient conditions such as temperature, etc.). As an example, a calibrated PFM can be accurate as to flow rate measurements and flow rate estimations from a VFM can be precise with stability that exceeds that of a PFM. As such, a PFM and a VFM can differ in their characteristics where such differences can be leveraged for purposes of knowing when to calibrate a PFM.

As an example, a method can include acquiring data from a VFM and a PFM and plotting or otherwise analyzing the data with respect to time, which may provide for a differential with respect to time where if the differential becomes large and crosses a threshold, that may be an indication that the PFM is in need of calibration. As explained, when a field includes many sites with VFMs and PFMs, data may be acquired and analyzed for purposes of training one or more ML models, which can include one or more of classification models and/or prediction models. As explained, a prediction model can be trained to predict a time at which a PFM will be in need of calibration. As explained with respect to FIG. 7, a calibration controller may be utilized that can schedule, optimize a schedule, etc., for purposes of performing field calibrations of PFMs.

A U.S. Provisional Application having Ser. No. 63/358, 189, filed 4 Jul. 2022, entitled "Field Pump Equipment System", is incorporated by reference herein in its entirety (referred to herein as the '189 application). The '189 application describes various techniques for predictions of equipment conditions. As explained herein, a PFM that is in need of calibration can be an equipment condition of the PFM. As an example, a VFM can be utilized to generate information that can be utilized as input, along with other input, to a trained ML model that is a predictor. For example, a flow rate estimate of a VFM can be utilized as input. As an example, one or more pressures, temperatures, etc., can be utilized as input.

Figure 9:
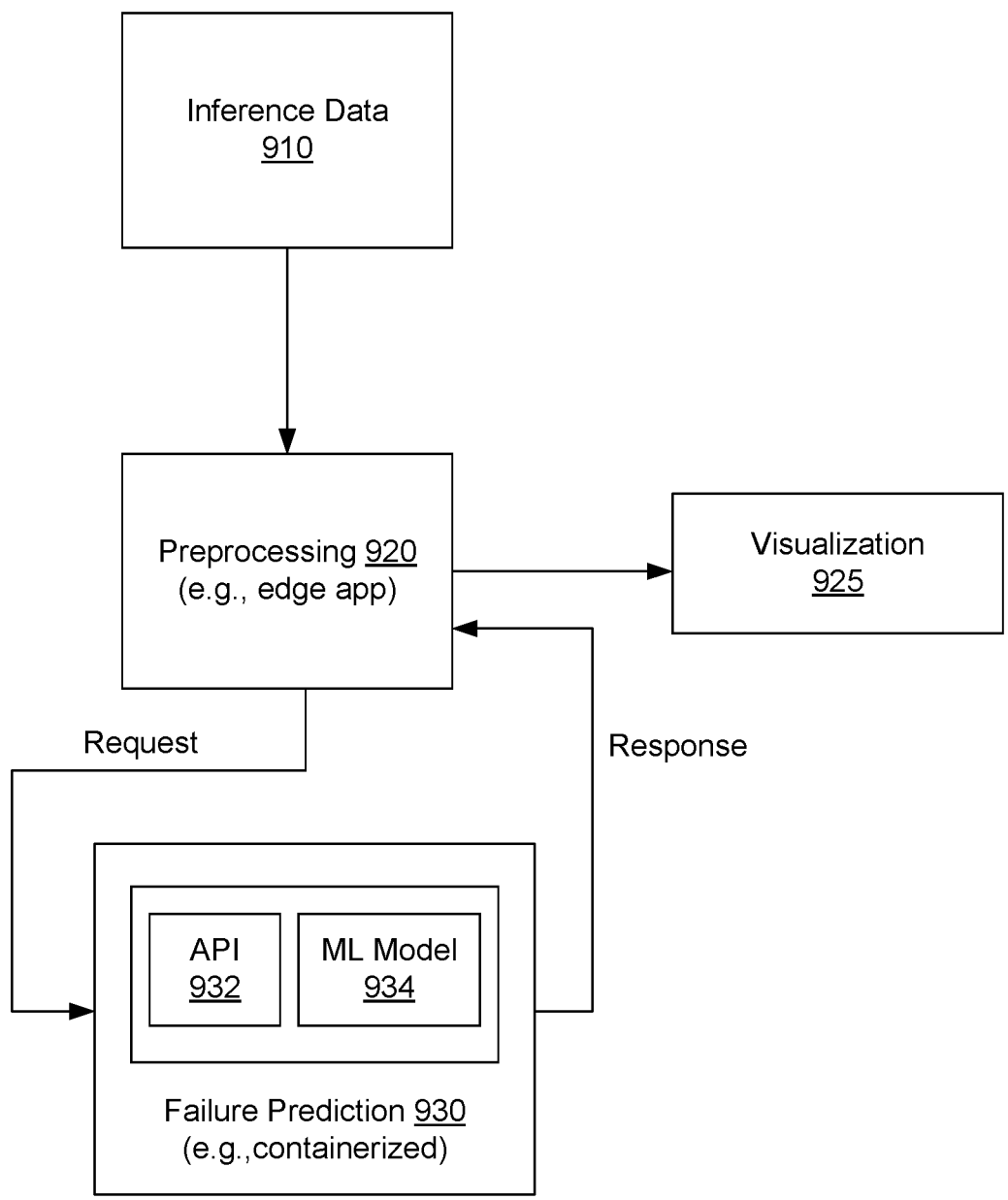
FIG. 9 illustrates an example of a system.

FIG. 9 shows an example of a system 900 that includes components for inference data acquisition 910, data preprocessing 920, optional data visualization 925, and failure prediction 930, which can be implemented using a containerized application programming interface (API) 932 for access to a trained ML model 934. As shown, an edge application architecture can be utilized where a suitable language or languages may be implemented (e.g., JSON, etc.). In the example of FIG. 9, the system 900 can preprocess data where API calls can be in the form of JSON requests where JSON responses can be received. In the example of FIG. 9, the system 900 can include one or more edge applications and one or more types of components (e.g., containerized, etc.) that may be accessed using one or more APIs.

Figure 10:
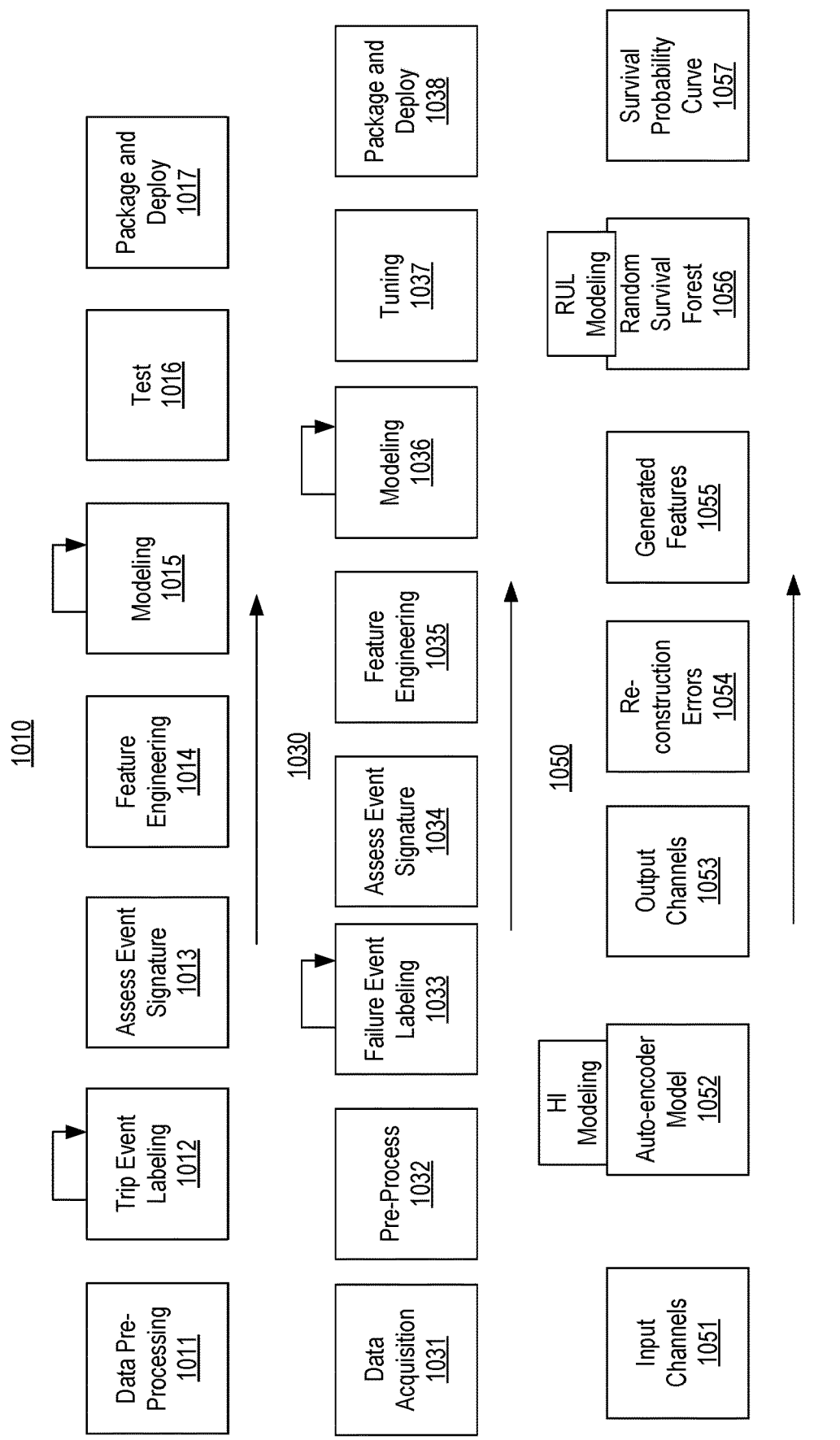
FIG. 10 illustrates examples of methods.

FIG. 10 shows examples of methods 1010, 1030 and 1050. As shown, the method 1010 can include a data pre-processing block 1011, a trip event labeling block 1012 that may utilize one or more subject matter experts (SMEs), an assessment block 1013 for assessing event signatures, a feature engineering block 1014 for determination of suitable features, a modeling block 1015 that may be iterative, a test block 1016 for testing a trained model of the modeling block 1015, and a package and deployment block 1017, which can provide for containerized packaging and deployment, for example, to an edge device.

As shown, the method 1030 includes a data acquisition block 1031 for acquisition of suitable frequency time series signal data like pressure, temperature, flow rates, etc., which can be from VFMs and PFMs; a pre-processing block 1032 to handle outliers, inconsistencies, frequency and other quality control issues; and a failure event labeling block 1033 that can utilize (SME) assistance, for example, such that data are labeled to mark start time and end time of failure events, where a failure event can be a failure of a PFM, which may be amenable to servicing to calibrate the PFM. In such an example, labeling can be binary, where 0 indicates no event and 1 indicates the presence of a failure event. Failure events may be identified by indicator signals such as, for example, a difference between a VFM flow rate and a PFM flow rate. As shown, the method 1030 can further include an assessment block 1034 for assessing event signatures, a feature engineering block 1035 for feature engineering, a modeling block 1036 for model generation, a model tuning block 1037 and a package and deployment block 1038.

In various regions in data before and after failure events, anomalous behavior regions can be identified. As an example, data can be split into regions of normal behavior and anomalous behavior, with an underlying assumption that failure precursors are absent in the regions of normal behavior. Such an approach provides for creating a dataset suitable for ML model training and testing such that a ML model can be trained for input of normal behavior data to replicate that normal behavior data. Such a trained ML model can be expected to be able to closely replicate information as to a PFM behaving normally and to experience error when trying to replicate information as to a PFM behaving abnormally because the ML model is not trained on data representative of anomalous behavior (e.g., abnormal behavior).

As an example, an autoencoder ML model may be utilized that includes an encoder portion and a decoder portion. An autoencoder ML model can be described where the encoder portion maps input into code and where the decoder portion that maps the code to a reconstruction of the input. An autoencoder ML model can be a feedforward, non-recurrent neural network (e.g., akin to single layer perceptrons) that participate in multilayer perceptrons (MLP), for example, employing an input layer and an output layer connected by one or more hidden layers. An output layer can include the same number of nodes (neurons) as the input layer. As explained, an autoencoder ML model can reconstruct its inputs (e.g., by minimizing the difference between the input and the output) instead of predicting a target value Y given inputs X. As an example, an autoencoders ML model can be trained using unsupervised learning. As explained, data can be acquired and processed such that the data represent normal behavior of a PFM where, once available, a ML model may be trained using such processed data in an unsupervised manner.

As explained, a ML model can emulate normal behavior where the ML model is built using an autoencoder-decoder model architecture. As explained, output of such a ML model can be expected to be the same as the input (e.g., original high-frequency signals). Such a ML model can be used to compute deviations in input signals by providing as input more complete time series data. For example, consider an approach that involves calculating absolute differences between input and output (e.g., reconstruction errors).

Through use of a trained ML model, reconstruction errors can be generated where higher errors can be an indicator of input indicative of anomalous behavior. As to feature engineering, features can be generated using reconstruction errors to build another ML model. For example, consider use of a random survival forest model that can provide predictions as a survival curve for each timestamp. Given a survival curve, remaining useful life (RUL) of a PFM can be evaluated, where RUL is an indicator of time to a need for calibration.

A random survival forest (RSF) is an ensemble of tree-based learners. A RSF ensures that individual trees are de-correlated by 1) building each tree on a different bootstrap sample of the original training data, and 2) at each node, evaluating the split criterion for a randomly selected subset of features and thresholds. Predictions can be formed by aggregating predictions of individual trees in the ensemble. The RSF can be constructed with numerous independent decision trees where each can receive a random subset of samples and randomly select a subset of variables at each split in a tree for prediction and where a final prediction can be an average of the prediction of each individual tree.

A RSF can be used, for example, to provide predictions for disease such as, for example, breast cancer. Consider a dataset for 686 women and 8 prognostic factors: 1. age, 2. estrogen receptor (estrec), 3. whether or not a hormonal therapy was administered (horTh), 4. menopausal status (menostat), 5. number of positive lymph nodes (pnodes), 6. progesterone receptor (progrec), 7. tumor size (tsize), 8. tumor grade (tgrade). In such an example, a goal can be to predict recurrence-free survival time. A method can include load the data and transform it into numeric values followed by splitting the data 75/25 for training and testing. As to training, one or more of several split criteria can be utilized (e.g., log-rank test, etc.). Once trained, the RSF can be tested using the testing data.

As an example, a time-dependent Cox model may be utilized for purposes of survival (e.g., RUL). A time-dependent Cox model can be a time-dependent Cox regression model (TDCM), which quantifies the effect of repeated measures of covariates in an analysis of time to event data. As an example, one or more of a pooled logistic regression model (PLRM), a cross sectional pooling model (CSPM), a Kaplan-Meier survival model and a log-rank test model may be implemented (e.g., for output, for comparisons, for additional output, etc.). As an example, a survival model that accounts (e.g., statistically) for times at which time dependent covariates are measured may provide more reliable estimates compared to an unadjusted approach.

As to making predictions, a sample can be dropped down each tree in the forest until it reaches a terminal node. Data in each terminal node may be used to non-parametrically estimate the survival and cumulative hazard function, for example, using the Kaplan-Meier and Nelson-Aalen estimator, respectively; noting that one or more other approaches may be implemented, additionally or alternatively. As an example, a risk score can be computed that represents the expected number of events for one particular terminal node. An ensemble prediction can be generated, for example, by averaging across the trees in the forest. As an example, a method can include generation of a predicted survival function, which may show differences within certain periods of time.

Referring again to FIG. 10, the method 1050 includes an input channels block 1051, an autoencoder model block 1052 for health indicator (HI) modeling, an output channels block 1053, a reconstruction error block 1054, a feature generation block 1055, a RSF block 1056 for RUL modeling, and a survival probability curve block 1057.

As mentioned, one or more approaches may be utilized for RUL modeling. As an example, a trained machine learning model can include decision trees. For example, consider decision trees that are part of a random survival forest (RSF or RSF model). As an example, a trained machine learning model can include a time-dependent Cox model.

In the example of FIG. 10, the method 1050 can include iterative modeling that may be performed by hyperparameter optimization for models utilized where an inference pipeline can be built. As an example, models can be packaged as a standalone container (e.g., DOCKER container of Docker, Inc., Palo Alto, California, etc.) that can reside on a physical gateway (e.g., an edge device). As explained with respect to the example of FIG. 9, a containerized set of models can provide for interactions with one or more applications on the edge to provide a survival probability curve for signals, which may be at each timestamp per well, which may be visualized on one or more devices.

As explained, a method can include using one or more trained ML models to predict when a PFM is likely to be in need of calibration. Such a method can utilize VFM data and PFM data where, for example, a combination of such data may provide for differential trends that can be used to train one or more ML models to make predictions. One or more trained ML models can receive VFM data and PFM data as input and output information as to what is likely to happen in the future as to one or more PFMs, particularly when one or more PFMs are likely to be too far off in their measurements and hence in need of calibration. As explained, a calibration controller such as the calibration controller 700 of FIG. 7 can provide for schedule optimization such that field operations can be performed in a more efficient manner. As an example, the calibration controller 700 of FIG. 7 can include and/or be operatively coupled to one or more frameworks, which may be edge frameworks with features, for example, as shown in the systems of FIG. 6 and/or FIG. 9. As explained, in FIG. 9, failure prediction can be a calibration failure prediction, where failure may be determined with respect to a threshold (e.g., an error threshold for when error is intolerable for one or more reasons).

As an example, a data science framework may be implemented (e.g., the DATAIKU framework, Dataiku, Paris, France) along with a container framework (e.g., the DOCKER framework). In such an example, the container framework can provide for construction of a unit of software that packages up executable code and its dependencies such that an application can execute quickly and reliably from one computing environment to another. As an example, a container can be an image that is a lightweight, standalone, executable package of software that includes code, runtime, system tools, system libraries and settings. A container image can become a "container" at runtime, for example, when run on a suitable engine (e.g., DOCKER engine for a DOCKER container image). As an example, an edge implementation may utilize a framework such as, for example, a lightweight machine learning framework such as the TENSORFLOW LITE (TFL) framework (GOOGLE LLC, Mountain View, California).

As mentioned, a method can involve training one or more machine learning models (ML models), which may involve one or more types of training (e.g., supervised learning, unsupervised learning, a combination of supervised and unsupervised learning, etc.). As an example, learning (e.g., training) can involve accessing data, which may be split into training and testing data, and then training one or more ML models using the training data to generate one or more trained ML models followed by testing the one or more trained ML models using the testing data. In such an approach, various model parameters may be set and/or various hyperparameters set and/or adjusted. In machine learning, model quality can depend on both model parameters and hyperparameters.

As an example, a machine learning framework can include one or more machine learning models. As an example, a multiple linear regression model (MLR model) can be a machine learning model (ML model). As an example, an artificial neural network (ANN) model can be a machine learning model (ML model). As an example, a trained ML model may be implemented for one or more purposes.

As an example, a ML model can be a non-physics-based ML model, a physics-based ML model and/or include one or more physics-based models. As an example, a ML model can be relatively light-weight, which may expedite learning and/or reduce computational resource demand to generate a trained ML model or ML models.

As to types of machine learning models, consider one or more examples such as a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network (CNN), stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model, may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a device and/or distributed devices may utilize TENSORFLOW LITE (TFL) or another type of lightweight framework. For example, one or more pieces of equipment at a wellsite may include and/or utilize a lightweight framework suitable for execution of a machine learning model (e.g., a trained ML model, etc.). TFL includes a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). TFL has multiple platform support, covering ANDROID and iOS devices, embedded LINUX, and microcontrollers. TFL has diverse language support, which includes JAVA, SWIFT, Objective-C, C++, and PYTHON. TFL provides high performance, with hardware acceleration and model optimization. Various machine learning tasks may be performed using TFL, which may include, for example, data processing, image classification, object detection, pose estimation, question answering, text classification, etc., on multiple platforms.

Figure 11:
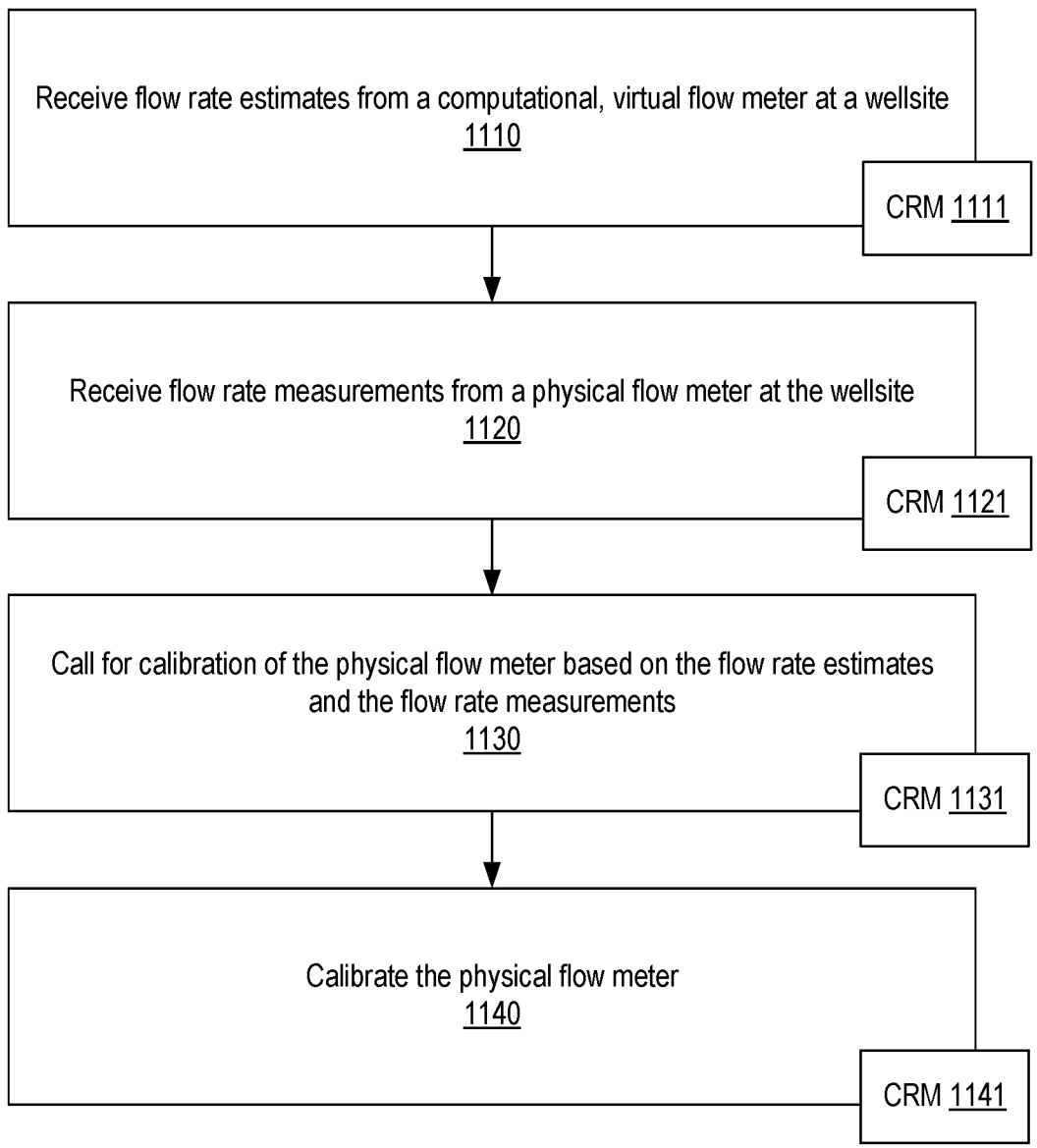
FIG. 11 illustrates an example of a method.

FIG. 11 shows an example of a method 1100 that includes a reception block 1110 for receiving flow rate estimates from a computational, virtual flow meter at a wellsite; a reception block 1120 for receiving flow rate measurements from a physical flow meter at the wellsite; a call block 1130 for calling for calibration of the physical flow meter based on the flow rate estimates and the flow rate measurements; and a calibration block 1140 for calibrating the physical flow meter. As an example, one or more computer-readable storage media can be utilized that include processor-executable instructions that can provide for one or more of the actions of the method 1100 when executed by a processor of a computing system, which may be a computing system with local components and/or remote components. For example, consider an edge device that is local at a wellsite where the edge device may be operatively coupled to a remote device via a network connection.

In FIG. 11, the method 1100 is shown along with various computer-readable media blocks 1111, 1121, 1131 and 1141 (e.g., CRM blocks). Such blocks may be utilized to perform one or more actions of the method 1100. For example, consider a computing system where instructions may include instructions of one or more of the CRM blocks 1111, 1121, 1131 and 1141.

Figure 12:
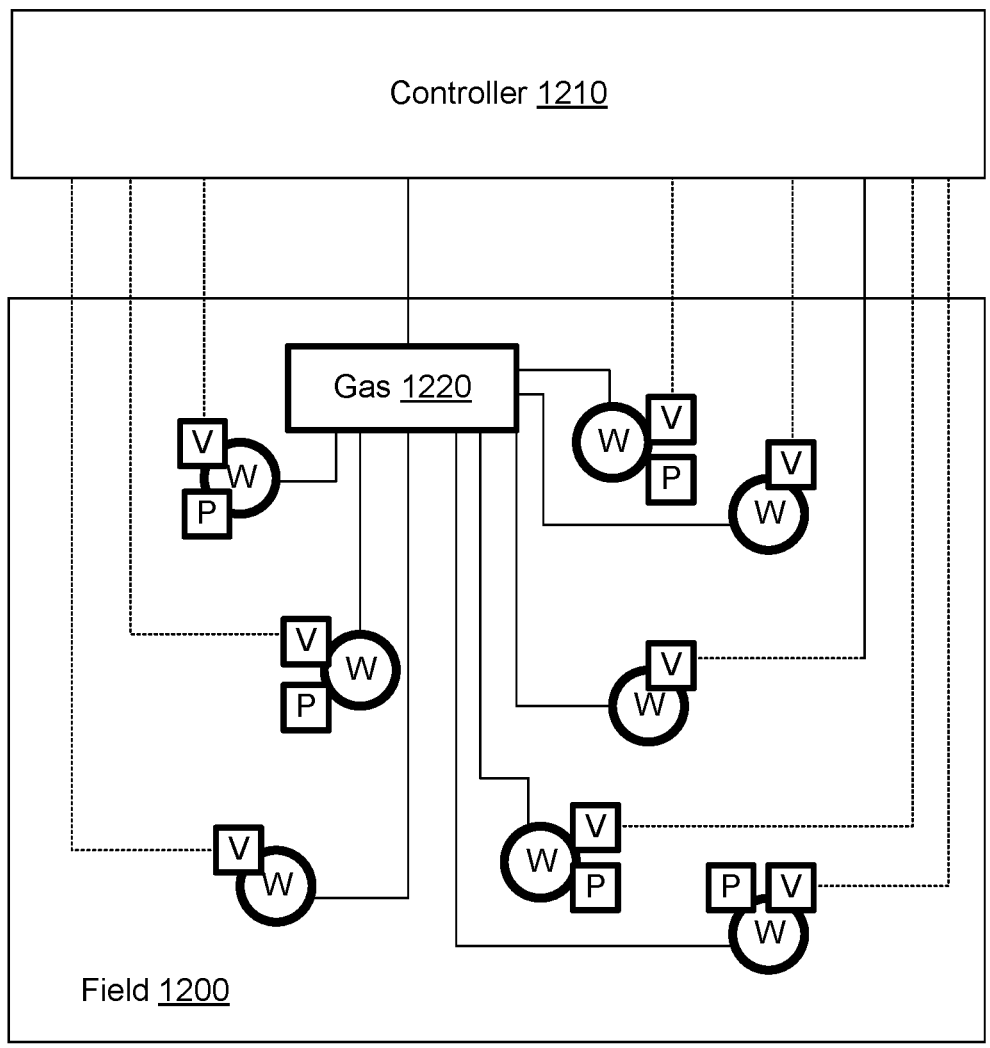
FIG. 12 illustrates an example of a controller.

FIG. 12 shows an example of a controller 1210 with respect to a field 1200 that includes wells (W), VFMs (V), PFMs (P) and a supply of gas 1220. As shown, the controller 1210 can issue instructions to the field 1200 such that gas from the gas supply 1220 may be controlled at a manifold and/or locally (e.g., well-by-well, etc.). As an example, a wired and/or a wireless network may be utilized for control and/or receipt of output from the VFMs (V). In FIG. 12, the VFMs can be utilized for one or more purposes. For example, some of the sites do not include a PFM such that a VFM can be utilized as a surrogate. Where sites do include a PFM and a VFM, the VFM may be utilized to determine when the PFM is in need of calibration. As an example, during a calibration period or other downtime of a PFM, a VFM may be automatically used for flow rate estimation and optionally control. In such an example, once a PFM is calibrated or otherwise back online, flow rate measurements from the PFM may be utilized, for example, for tracking production, control, etc. As an example, a site may use a combination of VFM estimations and PFM measurements for one or more purposes. As an example, the controller 1210 of FIG. 12 can include various features of the calibration controller 700 of FIG. 7.

Figure 13:
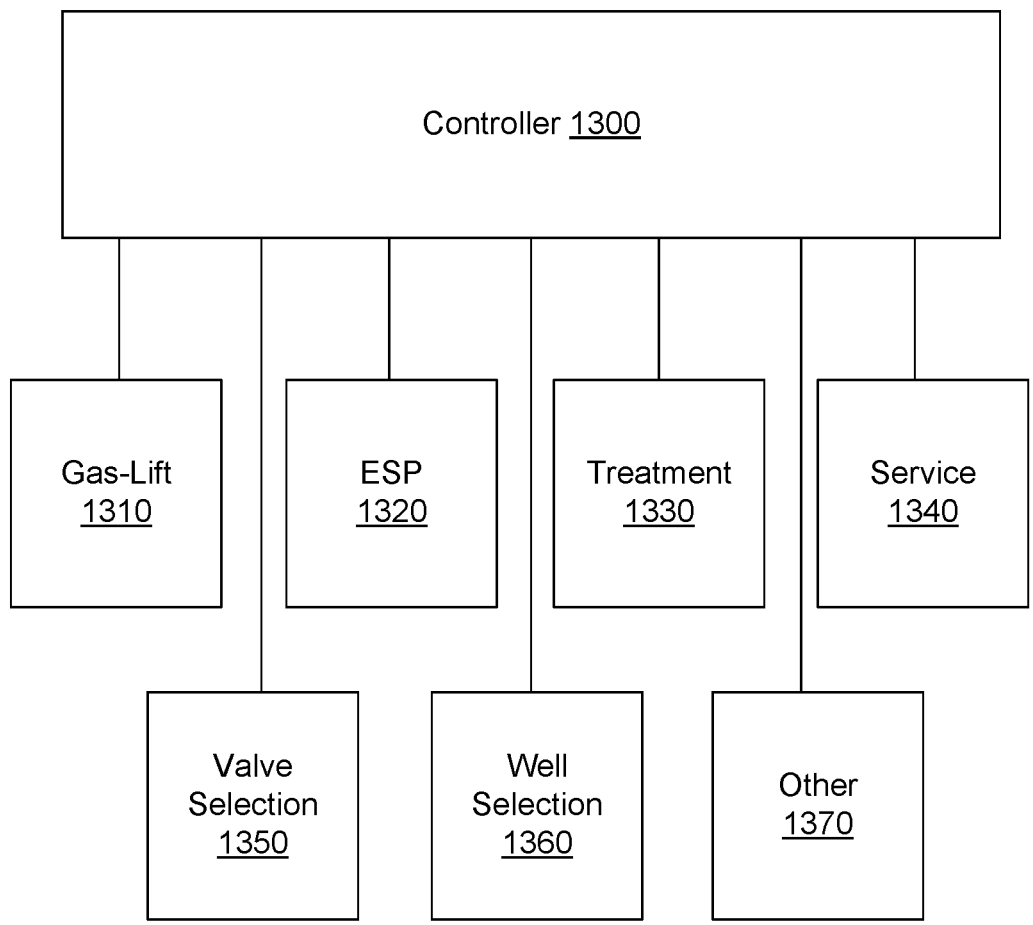
FIG. 13 illustrates an example of a controller.

FIG. 13 shows an example of a controller 1300, which may be implemented as the controller 1210 of FIG. 12. In the example of FIG. 13, the controller 1300 can include one or more components such as, for example, one or more of a gas lift component 1310, an electric submersible pump component 1320, a treatment component 1330, a service component 1340, a valve selection component 1350, a well selection component 1360 and one or more other components 1370. As explained, information gleaned via control such as according to one or more methods may be utilized to determine one or more actions that may aim to improve production, improve operation of equipment (e.g., valves, flow meters, etc.), improve utilization of one or more resources (e.g., gas, electricity for an ESP, chemical injection, etc.).

As an example, a method can include receiving flow rate estimates from a computational, virtual flow meter at a wellsite; receiving flow rate measurements from a physical flow meter at the wellsite; and calling for calibration of the physical flow meter based on the flow rate estimates and the flow rate measurements. In such an example, the method can include calibrating the physical flow meter. For example, consider calibrating the physical flow meter by performing manual tasks at the wellsite and/or calibrating the physical flow meter by performing tasks at the wellsite responsive to receipt of a command by a network interface at the wellsite.

As an example, a method can include tracking differences between flow rate estimates and flow rate measurements with respect to time. In such an example, the flow rate estimates can exhibit greater stability than the flow rate measurements. As an example, a method can include calling for calibration of a physical flow meter responsive to at least one difference exceeding a threshold.

As an example, a method can include predicting a time for calibration using a trained machine learning model. In such an example, a method can include optimizing a schedule for a plurality of physical flow meter calibrations based at least in part on the time. In such an example, optimizing can include utilizing one or more criteria where, for example, the one or more criteria can include a distance criterion between different wellsites, a time span criterion and/or one or more other criteria.

As an example, a method can include calling for calibration of a physical flow meter in a manner that occurs responsive to a time on a schedule. In such an example, the schedule can include times for calibration of other physical flow meters, which may be at the same site or at different sites.

As an example, a physical flow meter can be at a manifold where, for example, one or more physical flow meters may be upstream from the manifold. In such an example, each of the physical flow meters upstream from the manifold may have a corresponding computational, virtual flow meter.

As an example, a system can include one or more processors; memory accessible to at least one of the one or more processors; processor-executable instructions stored in the memory and executable to instruct the system to: receive flow rate estimates from a computational, virtual flow meter at a wellsite; receive flow rate measurements from a physical flow meter at the wellsite; and call for calibration of the physical flow meter based on the flow rate estimates and the flow rate measurements.

As an example, one or more computer-readable storage media can include processor-executable instructions to instruct a computing system to: receive flow rate estimates from a computational, virtual flow meter at a wellsite; receive flow rate measurements from a physical flow meter at the wellsite; and call for calibration of the physical flow meter based on the flow rate estimates and the flow rate measurements.

As an example, a computer program product can include one or more computer-readable storage media that can include processor-executable instructions to instruct a computing system to perform one or more methods and/or one or more portions of a method.

Figure 14:
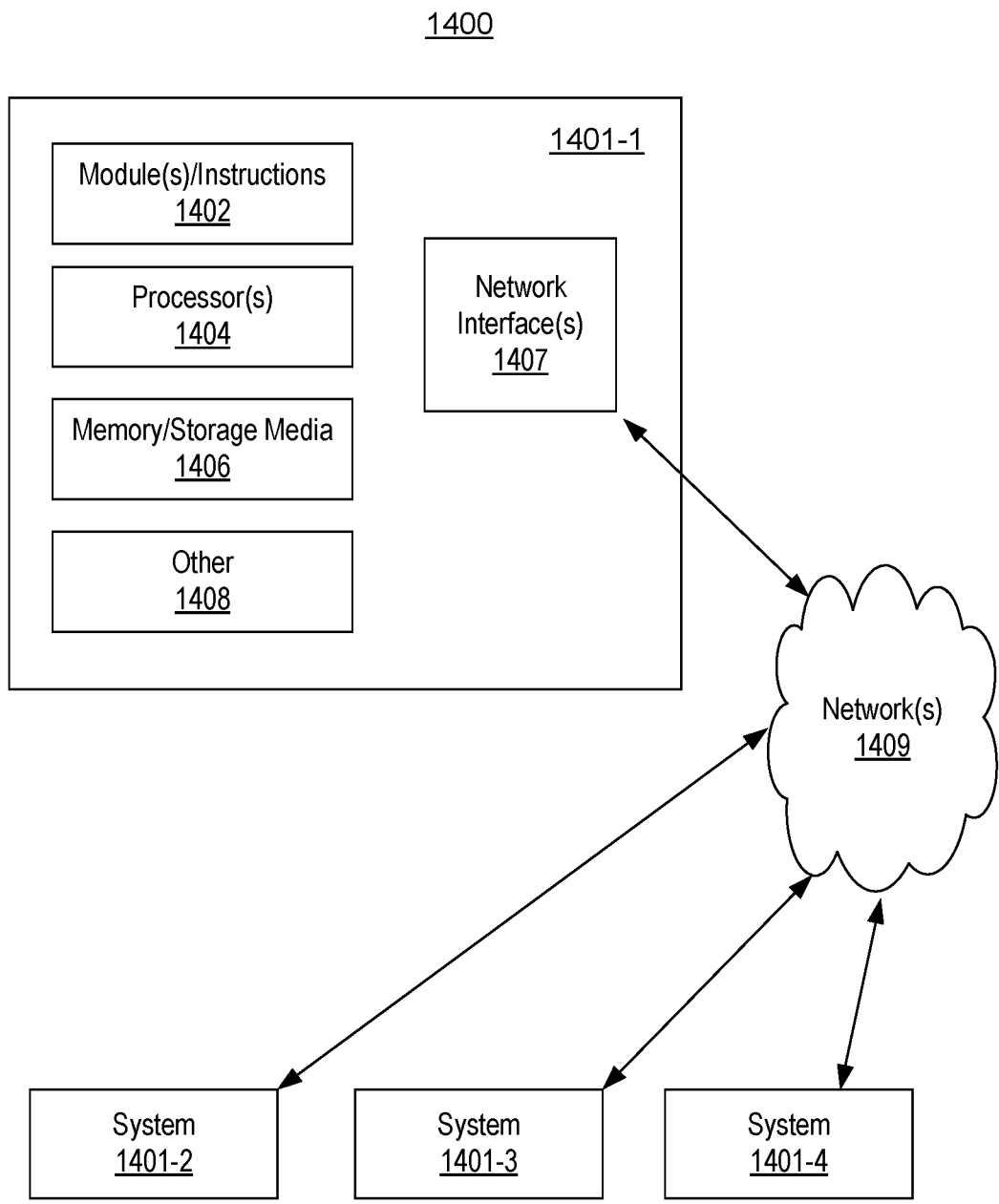
FIG. 14 illustrates examples of computer and network equipment.

In some embodiments, a method or methods may be executed by a computing system. FIG. 14 shows an example of a system 1400 that can include one or more computing systems 1401-1, 1401-2, 1401-3 and 1401-4, which may be operatively coupled via one or more networks 1409, which may include wired and/or wireless networks.

As an example, a system can include an individual computer system or an arrangement of distributed computer systems. In the example of FIG. 14, the computer system 1401-1 can include one or more modules 1402, which may be or include processor-executable instructions, for example, executable to perform various tasks (e.g., receiving information, requesting information, processing information, simulation, outputting information, etc.). For example, the one or more modules 1402 may include instructions of one or more of the CRM blocks 1111, 1121, 1131 and 1141 of FIG. 11.

As an example, a module may be executed independently, or in coordination with, one or more processors 1404, which is (or are) operatively coupled to one or more storage media 1406 (e.g., via wire, wirelessly, etc.). As an example, one or more of the one or more processors 1404 can be operatively coupled to at least one of one or more network interfaces 1407; noting that one or more other components 1408 may also be included. In such an example, the computer system 1401-1 can transmit and/or receive information, for example, via the one or more networks 1409 (e.g., consider one or more of the Internet, a private network, a cellular network, a satellite network, etc.).

As an example, the computer system 1401-1 may receive from and/or transmit information to one or more other devices, which may be or include, for example, one or more of the computer systems 1401-2, etc. A device may be located in a physical location that differs from that of the computer system 1401-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 15:
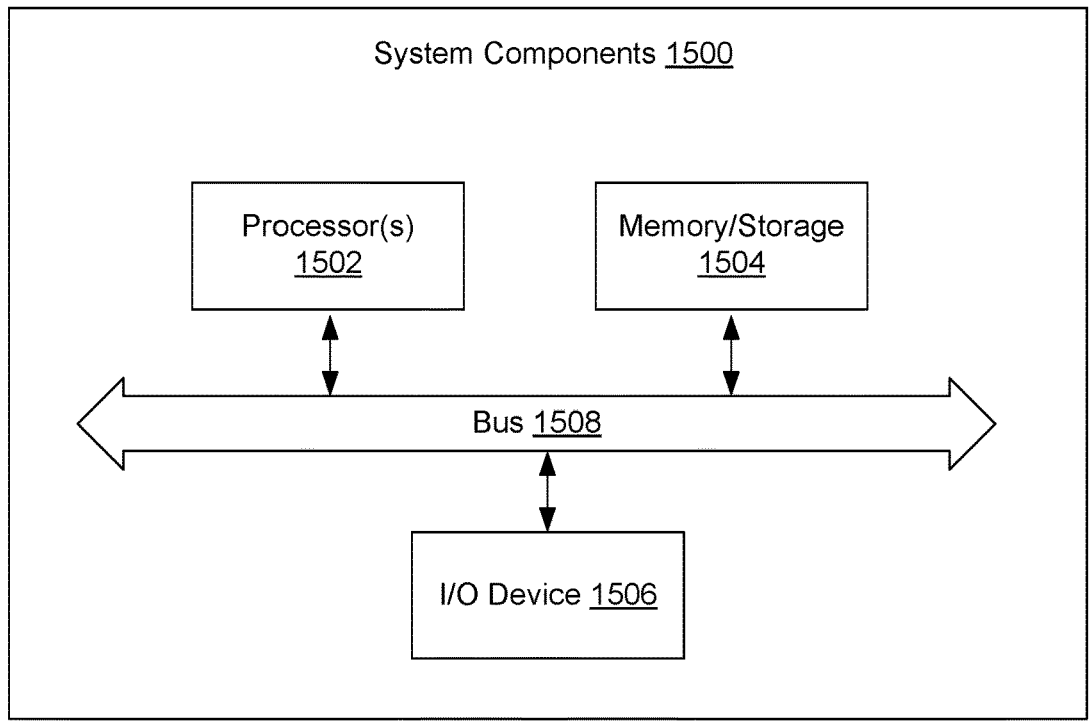
FIG. 15 illustrates example components of a system and a networked system.
Figure 15:
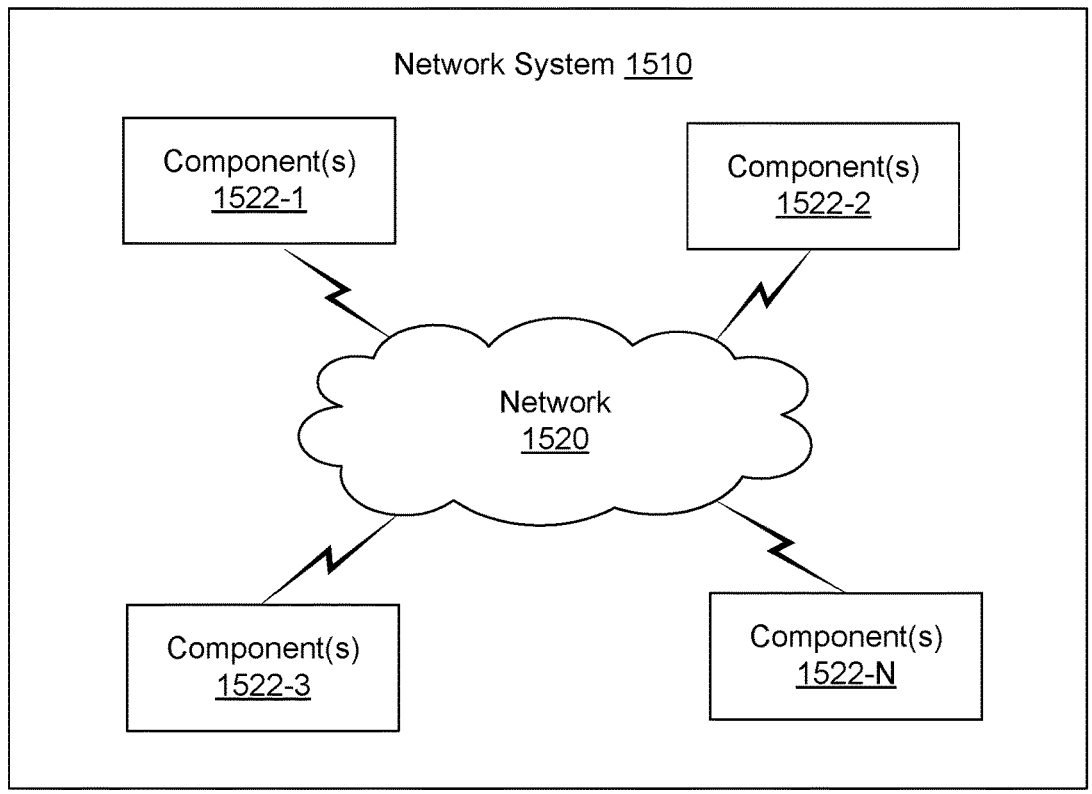

FIG. 15 shows components of an example of a computing system 1500 and an example of a networked system 1510 with a network 1520. The system 1500 includes one or more processors 1502, memory and/or storage components 1504, one or more input and/or output devices 1506 and a bus 1508. In an example embodiment, instructions may be stored in one or more computer-readable media (e.g., memory/storage components 1504). Such instructions may be read by one or more processors (e.g., the processor(s) 1502) via a communication bus (e.g., the bus 1508), which may be wired or wireless. The one or more processors may execute such instructions to implement (wholly or in part) one or more attributes (e.g., as part of a method). A user may view output from and interact with a process via an I/O device (e.g., the device 1506). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1510. The network system 1510 includes components 1522-1, 1522-2, 1522-3, . . . 1522-N. For example, the components 1522-1 may include the processor(s) 1502 while the component(s) 1522-3 may include memory accessible by the processor(s) 1502. Further, the component(s) 1522-2 may include an I/O device for display and optionally interaction with a method. The network 1520 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
receiving flow rate measurements from a physical flow meter at a wellsite;
receiving, via a network interface at the wellsite, flow rate estimates from a computational, virtual flow meter at the wellsite;
tracking differences comprising at least one of a first difference between the flow rate estimates and the flow rate measurements with respect to time or a second difference between a first stability exhibited by the flow rate estimates and a second stability exhibited by the flow rate measurements;
predicting a time for calibration using a trained machine learning model;
optimizing a schedule for calibrating a plurality of physical flow meters including the physical flow meter based at least in part on the time, wherein optimizing comprises utilizing one or more criteria, and wherein the one or more criteria comprise a distance criterion between the wellsite and at least one other wellsite; and
calibrating the physical flow meter via the network interface based on at least one of (i) the flow rate estimates and the flow rate measurements or (ii) the differences.

2. The method of claim 1, wherein calibrating the physical flow meter comprises performing manual tasks at the wellsite.

3. The method of claim 1, wherein calibrating the physical flow meter comprises performing tasks at the wellsite responsive to receipt of a command by the network interface at the wellsite.

4. The method of claim 1, wherein the one or more criteria further comprise a time span criterion.

5. The method of claim 1, wherein the physical flow meter is at a manifold.

6. The method of claim 5, wherein a remainder of the plurality of physical flow meters is upstream from the manifold.

7. The method of claim 6, further comprising a plurality of computational, virtual flow meters including the computational, virtual flow meter, each computational, virtual flow meter of the plurality of computational, virtual flow meters corresponding to a respective physical flow meter of the plurality of physical flow meters.

8. A method comprising:
receiving flow rate measurements from a physical flow meter at a manifold at a wellsite, wherein a plurality of additional physical flow meters is upstream from the manifold;
receiving, via a network interface at the wellsite, flow rate estimates from a computational, virtual flow meter of a plurality of computational, virtual flow meters, wherein the computational, virtual flow meter is at the wellsite and corresponds to the physical flow meter, and wherein each computational, virtual flow meter of a remainder of the plurality of computational, virtual flow meters corresponds to a respective additional physical flow meter of the plurality of additional physical flow meters;
tracking differences comprising at least one of a first difference between the flow rate estimates and the flow rate measurements with respect to time or a second difference between a first stability exhibited by the flow rate estimates and a second stability exhibited by the flow rate measurements; and
calibrating the physical flow meter via the network interface based on at least one of (i) the flow rate estimates and the flow rate measurements or (ii) the differences.

9. The method of claim 8, wherein calibrating the physical flow meter comprises performing manual tasks at the wellsite.

10. The method of claim 8, wherein calibrating the physical flow meter comprises performing tasks at the wellsite responsive to receipt of a command by the network interface at the wellsite.

11. The method of claim 8, comprising predicting a time for calibration using a trained machine learning model.

12. The method of claim 11, comprising optimizing a schedule for calibrating the physical flow meter and the plurality of additional physical flow meters based at least in part on the time.

13. The method of claim 12, wherein optimizing comprises utilizing one or more criteria.

14. The method of claim 13, wherein the one or more criteria comprise a time span criterion.

15. The method of claim 8, wherein calibrating the physical flow meter occurs responsive to a time on a schedule.

16. The method of claim 15, wherein the schedule comprises times for calibration of the physical flow meter and the plurality of additional physical flow meters.

* * * * *